(12) United States Patent
Takada et al.

(10) Patent No.: US 6,681,570 B2
(45) Date of Patent: Jan. 27, 2004

(54) HYDROSTATIC TRANSMISSION WITH PRESSURE REGULATION MEANS

(75) Inventors: Kenichi Takada, Hyogo (JP); Irikura Koji, Hyogo (JP)

(73) Assignee: Kanzaki Kokykoki Mfg. Co., Ltd. (JP)

( * ) Notice: Subject to any disclaimer, the term of this patent is extended or adjusted under 35 U.S.C. 154(b) by 45 days.

(21) Appl. No.: 10/052,816

(22) Filed: Jan. 23, 2002

(65) Prior Publication Data

US 2002/0095933 A1 Jul. 25, 2002

(30) Foreign Application Priority Data

Jan. 23, 2001 (JP) ........................................ 2001-014095

(51) Int. Cl.⁷ ............................................... F16D 31/03
(52) U.S. Cl. ........................................... 60/468; 60/489
(58) Field of Search ..................... 60/468, 489

(56) References Cited

U.S. PATENT DOCUMENTS

| | | | | |
|---|---|---|---|---|
| 5,356,347 A | * | 10/1994 | Komura et al. ............... | 474/28 |
| 5,701,739 A | * | 12/1997 | Ohashi et al. ............... | 60/488 |
| 5,956,952 A | * | 9/1999 | Takada et al. ............... | 60/468 |
| 6,341,488 B1 | * | 1/2002 | Shimizu et al. .............. | 60/468 |
| 6,349,544 B1 | * | 2/2002 | Shimizu et al. .............. | 60/468 |
| 6,508,059 B1 | * | 1/2003 | Takada et al. ............... | 60/468 |

FOREIGN PATENT DOCUMENTS

| | | |
|---|---|---|
| JP | 4-66454 | 6/1992 |
| JP | 10-9385 | 1/1998 |

* cited by examiner

*Primary Examiner*—Edward K. Look
*Assistant Examiner*—Igor Kershteyn
(74) *Attorney, Agent, or Firm*—Sterne, Kessler, Goldstein & Fox P.L.L.C.

(57) ABSTRACT

A hydrostatic transmission comprising a housing formed with a fluid sump, a center section, a hydraulic pump, and a hydraulic motor. A fluid passage is formed in the center section. A bore is open at an outer surface of the center section in communication with the fluid passage. An output operation device is provided for controlling discharged fluid of the hydraulic pump. A piston having an outer surface is reciprocally inserted into the bore so as to be allowed to project outward from the center section. A valve is disposed within the bore. The valve is biased to be closed by a spring disposed between the valve and the piston. A member interlocks with the output operation device so as to contact with the outer surface of the piston.

16 Claims, 15 Drawing Sheets

HYDROSTATIC TRANSMISSION WITH PRESSURE REGULATION MEANS

BACKGROUND OF THE INVENTION

1. Field of the Invention

The present invention relates to a hydrostatic transmission having a hydraulic pump and a hydraulic motor fluidly connected with each other. Especially, it relates to a pressure regulation means for adjusting hydraulic pressure in a closed hydraulic circuit of the hydrostatic transmission.

2. Background Art

Conventionally, there is a well-known continuously variable transmission generally called a hydrostatic transmission or an HST which includes a hydraulic pump with a movable swash plate fluidly connected to a hydraulic motor with either a movable swash plate or a fixed swash plate, wherein the movable swash plate(s) is (are) moved so as to change the capacity of the hydraulic pump (the capacities of the hydraulic pump and motor), thereby changing the rotational speed and direction of rotational force output from the hydraulic motor. This transmission is used for various uses, e.g., for driving a vehicle.

Furthermore, as disclosed in Japanese Utility Model Provisional Publication No. 66454/92, there is a well-known HST provided with a neutral-returning spring and a shock absorber which are attached to a control arm interlockingly connected to the swash plate in the HST. By the neutral-returning spring, the movable swash plate is automatically returned to its neutral position when the control arm is released from an operational force.

The shock absorber prevents a dynamic brake which happens if the automatic returning of the movable swash plate to its neutral position is sudden.

On the other hand, Japanese Patent Provisional Publication No. 9385/98 points out a problem of the external arrangement of the shock absorber, wherein the movement of the shock absorber is unstable because of the influence of variable air conditions such as air temperature and the external shock absorber prevents the apparatus from being minimized. The document also proposes such a construction that, instead of the external shock absorber, pistons, which are pushed out by the hydraulic pressure of oil discharged from the hydraulic pump when a movable swash plate of the hydraulic pump is rotated from its neutral position, abut against the control arm. Such pistons are advantageous in their stable movement and contribution for minimization of the HST apparatus.

Furthermore, the document proposes means for adjusting the hydraulic pressure in the HST circuit, wherein tips of the pistons are opened and the surface of the control arm abutting the tips of the pistons are formed with grooves so that the tip opening of each of the pistons communicates with each of the grooves until the control arm rotated from its neutral position reaches a certain angle in the vicinity of the neutral position. Consequently, when the control arm is located in the vicinity of its neutral position, the oil generating a remaining hydraulic pressure in the HST circuit is drained through the groove, thereby suppressing the shock when the vehicle stops and expanding the neutral zone of the HST so as to securely hold the vehicle stationary. On the other hand, since the tip openings of the pistons are closed by the control arm when the control arm is rotated from the vicinity of its neutral position, i.e., the expanded neutral zone, the oil in the HST circuit is not drained so as to secure the good operational efficiency of the HST. The proposed means have these advantages.

For the disposal of the hydraulic pump and the hydraulic motor in the housing serving as the oil sump, the voluminal increase of hydraulic oil in the housing, which is caused by variation of the oil temperature, must be absorbed. Generally, an oil reservoir is provided for this absorption. A tank disposed outside the housing may serve as the oil reservoir. Otherwise, a part of an inner wall of the housing may be formed into an oil reservoir.

However, the arrangement of the tank as the oil reservoir outside the housing increases the number of parts and prevents the HST apparatus from being minimized. The oil reservoir formed of the housing requires a complicated mold for forming the housing, thereby increasing the number of processes and costs.

For solving the problems, it may be proposed that, instead of an oil reservoir, an amount of the hydraulic oil in the housing is reduced so as to be received therein even when it is expanded by heating. However, in the housing, the level of the reduced hydraulic oil is lowered and the air is filled thereabove. Accordingly, if a vehicle is left on a slope with its HST in neutral and with its engine at idle, the level of hydraulic oil may become lower than the tip opening of the piston or the groove, thereby causing the air in the housing to be unexpectedly absorbed into the HST circuit through the groove and the piston.

The air mixed with the hydraulic oil in the HST circuit causes the HST to free wheel wherein it may happen that the vehicle unexpectedly descends the slope or the vehicle does not start while it ascends the slope.

For another problem, if the neutral position of the HST is inaccurate, the hydraulic pump may unexpectedly discharge a little amount of hydraulic oil even when the HST is located at its neutral position, thereby driving the hydraulic motor so as to unexpectedly move the vehicle slowly. Therefore, some means for regulating hydraulicoil is required to solve this problem. However, if such means constantly drains increased hydraulic pressure oil from the HST circuit, the transmittal efficiency of the HST is reduced while the hydraulic pressure in the closed HST circuit must be increased in response to the operation of the HST.

BRIEF SUMMARY OF THE INVENTION

An object of the present invention is to provide an HST comprising a housing serving as a fluid sump in which a hydraulic pump and a hydraulic motor are fluidly connected with each other through a pair of fluid passages formed in a center section so as to constitute a closed hydraulic circuit (an HST circuit), wherein the HST circuit is optimally communicated with the fluid sump so as to regulate the hydraulic pressure therein in correspondence to various operational states, thereby expanding the neutral zone of the HST so as to secure the stationary state of a vehicle, resolving the dynamic brake when the vehicle stops, and so on. The HST is provided with an output regulating device for adjusting a degree of reciprocation of pistons in a cylinder block of either the hydraulic pump or the hydraulic motor, wherein the output regulating device is interlockingly connected to a control shaft so as to be moved to a plurality of operational positions from a neutral position according to rotation of the control shaft so that fluid discharged from the hydraulic pump is made to flow into the hydraulic motor through one of the pair of fluid passages and is returned to the hydraulic pump through the other of the pair of fluid passages.

To achieve the object, according to the present invention, the pair of fluid passages are provided with respective opening portions on the same surface of the center section. A pair of pistons, which allow fluid to flow therein, are reciprocally inserted into the respective opening portions of the pair of fluid passages so as to be allowed to project outward from the outer surface of the center section and be retracted into the center section. A valve is provided for opening and closing the opening portions of the pair of fluid passages. A spring is extended between the valve and the pair of pistons for biasing the valve so as to close the valve. A member interlocking with said control shaft is provided so as to face the pair of pistons. When the output regulating device is located in the vicinity of the neutral position and fluid in a higher-pressured one of the pair of fluid passages forcedly opens the valve and flows into a corresponding one of the pair of pistons, the member introduces the fluid through an orifice into either the fluid sump or a lower-pressured one of the pair of fluid passages.

Accordingly, the control shaft is prevented from suddenly returning to its neutral position, thereby preventing a dynamic brake from being generated in the HST. When the output regulating device interlocking with the control shaft is located in the vicinity of its neutral position, fluid is drained from the higher-pressured fluid passage to the fluid sump or led to the lower-pressured fluid passage, thereby solving the remaining hydraulic pressure in the HST circuit. Thus, the vehicle is comfortably brought from its traveling state into its stationary state.

To achieve the object of the present invention, a pressure regulating device communicating with at least one of the pair of hydraulic fluid passages is interlockingly connected to a speed changing operation device so that, when the speed changing operation device is located within a certain range including its neutral position, the pressure regulating device is brought into a first pressure setting condition, and that, when the speed changing operation device is located out of the certain range, the pressure regulating device is brought into a second pressure setting condition.

When the pressure regulating device is put in the first pressure setting condition, the hydraulic pressure in the HST circuit is so low as to keep a vehicle having the HST stationary while the engine of the vehicle runs. When the pressure regulating device is put in the second pressure setting condition, the hydraulic pressure in the HST circuit is so high as to allow the vehicle to travel.

Accordingly, even if a hydraulic pressure difference occurs between the pair of fluid passages caused by an inaccurate neutral position of the HST while the speed changing operational device is located at its neutral position, the pressure regulating device is put into the first pressure setting condition so as to resolve the hydraulic pressure difference. In other words, the neutral zone of the HST is expanded so as to secure the stationary state of the vehicle. When the speed changing operation device is located out of the expanded neutral zone of the HST, the pressure regulating device is put into the second pressure setting condition so as to enable hydraulic pressure in one of the pair of fluid passages to be increased responsively according to the shift degree of the speed changing operation device.

The pressure regulating device comprises a relief valve for draining hydraulic fluid from the corresponding hydraulic fluid passage. A spring biases the relief valve so as to close it against the hydraulic pressure in the corresponding hydraulic fluid passage. The spring is retained by a spring-retainer. A movable arm interlocking with the speed changing operation device is provided with a contact surface. The spring biases the spring-retainer so as to abut against the contact plate.

For selectively establishing the first pressure setting condition and the second pressure setting condition by operation of the pressure regulating device, the spring-retainer is formed with an opening, and an escaping groove is formed on the contact surface of the movable arm so as to be open to the fluid sump. By operation of the speed changing operation device, the movable arm is moved so as to selectively open or close the opening of the spring-retainer to and from the escaping groove, thereby establishing either the first pressure setting condition or the second pressure setting condition. That is, the opening is opened to the escaping groove in the first pressure setting condition, and the opening is closed from the escaping groove in the second pressure setting condition.

Accordingly, the regulation of hydraulic pressure in the HST circuit can be performed by such a simple and inexpensive manner that the opening of the spring-retainer is opened/closed to or from the escaping groove so as to switch the pressure regulating device, thereby simplifying the HST and reducing the manufacturing costs thereof.

An amount of hydraulic fluid made to flow from each of the pair of hydraulic fluid passages to the escaping groove by the pressure regulating device may be limited by an orifice. Accordingly, the hydraulic pressure oil is prevented from being suddenly drained in a large amount from the HST circuit so as to prevent the HST from being lacking in hydraulic pressure oil. Also, the amount of hydraulic pressure in the HST circuit required to hold a vehicle in stationary on a slope can be maintained.

Alternatively, the pressure regulating device comprising the relief valve, the spring, the spring-retainer and the movable arm having the contact surface may be so constructed that the movable arm is provided with a projection projecting from the contact surface of the movable arm so as to push the spring-retainer and compress the spring. By operation of the speed changing operation device, the movable arm is moved so as to extend or compress the spring, thereby establishing either the first pressure setting condition or the second pressure setting condition. That is, in the first pressure setting condition, the spring-retainer is offset from the projection so as to extend the spring, thereby reducing a hydraulic pressure required to open the relief valve. In the second pressure setting condition, the spring-retainer is pushed by the projection so as to compress the spring, thereby increasing the hydraulic pressure required to open the relief valve.

Accordingly, the regulation of hydraulic pressure in the HST circuit can be performed by such a simple and inexpensive manner that the spring biasing the relief valve is extended/compressed by the projection and the spring-retainer so as to adjust the relief hydraulic pressure which is required to open the relief valve, thereby simplifying the HST and reducing the manufacturing costs thereof.

The pressure regulating device may be provided with a hydraulic bypass allowing hydraulic fluid to flow from higher-pressured one of said pair of hydraulic fluid passages to the other lower-pressured one of said pair of hydraulic fluid passages. An orifice is installed in said hydraulic bypass.

In comparison with the above mentioned pressure regulating device which drains hydraulic oil from the higher-pressured fluid passage to the fluid sump, the hydraulic bypass makes the HST circuit resistant to the shortage of hydraulic fluid.

Alternatively, instead of the orifice, the pressure regulating device having the hydraulic bypass may be provided with a bypass valve installed in the hydraulic bypass. The bypass valve is opened when the hydraulic pressure upstream thereof is less than a predetermined value, and closed when the hydraulic pressure upstream thereof is not less than the predetermined value. The predetermined value is less than the hydraulic pressure which is established when the pressure regulating device is put in the first pressure setting condition.

Accordingly, even if the hydraulic pump discharges an extremely small amount of hydraulic fluid to one of the pair of hydraulic fluid passages with the speed changing operation device located at its neutral position, because of an inaccuracy in the neutral position of the HST, the hydraulic pressure of the discharged fluid is lower than the predetermined value so that the bypass valve is still opened so as to bypass the discharged fluid to the other hydraulic fluid passage, thereby maintaining the vehicle in stationary. On the other hand, when the speed changing device is shifted for traveling of the vehicle, the hydraulic pressure upstream of the bypass valve is increased to be not less than the predetermined value so that the bypass valve becomes hard to be opened, thereby securing sufficient hydraulic pressure for driving the HST.

Furthermore, due to the bypass valve which is closed by the predetermined value of hydraulic pressure lower than that established in the first pressure setting condition, the hydraulic pressure in the HST circuit can be adjusted among three conditions, i.e., the non-pressurized condition established by opening the bypass valve, and the first and second pressure setting conditions which are established when the bypass valve is closed. Thus, the condition of hydraulic pressure in the HST circuit can be adjusted delicately in correspondence to various situations.

Other and further objects, features and advantages of the invention will appear more fully from the following description.

BRIEF DESCRIPTION OF THE DRAWINGS/FIGURES

DETAILED DESCRIPTION OF THE INVENTION

Figure 1:
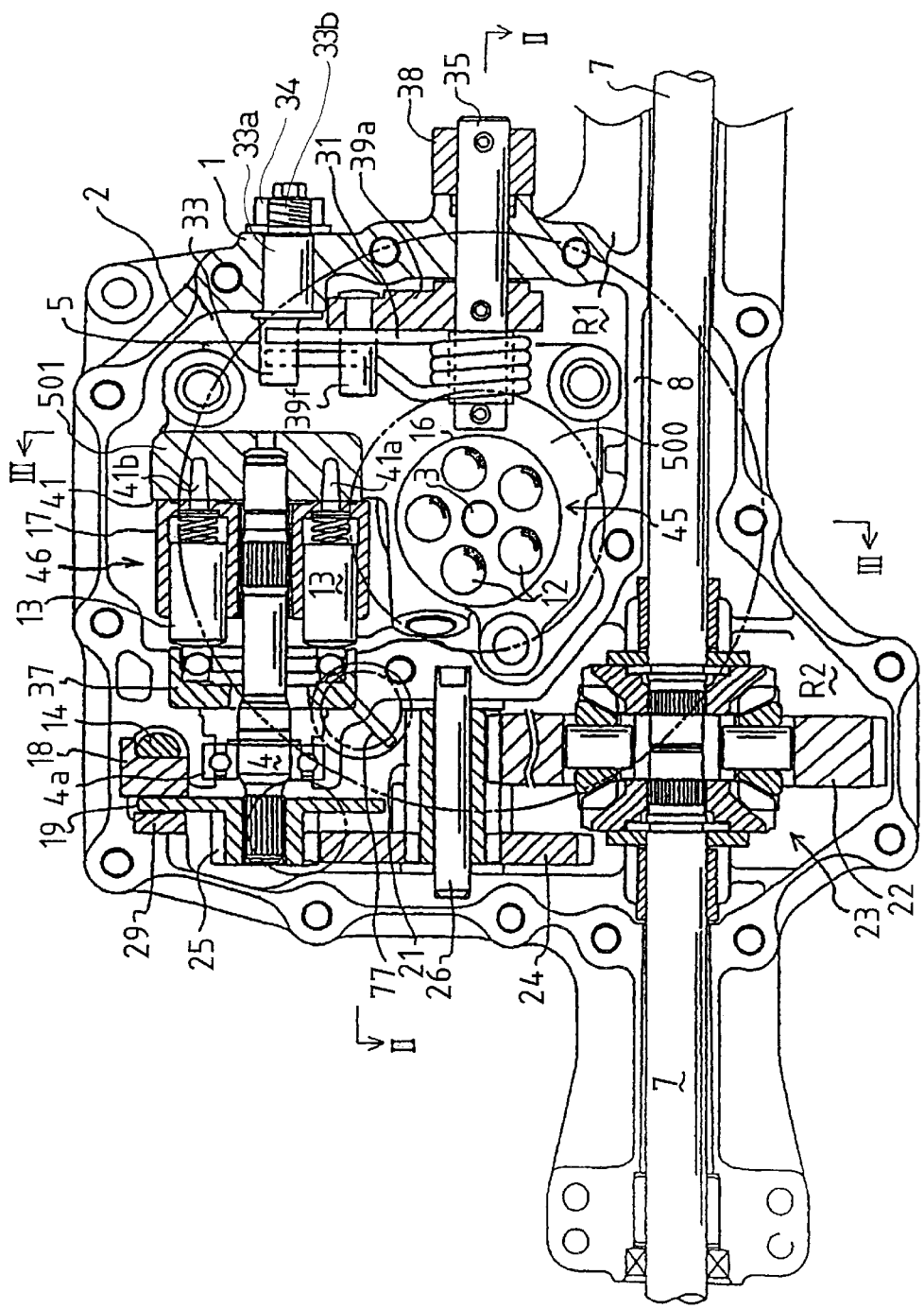
FIG. 1 is a plan view partly in section of an interior structure of an axle driving apparatus including an HST according to an embodiment of the present invention.

First of all, description will be given of an axle driving apparatus as one embodiment of the present invention in accordance with FIGS. 1 to 3.

Figure 2:
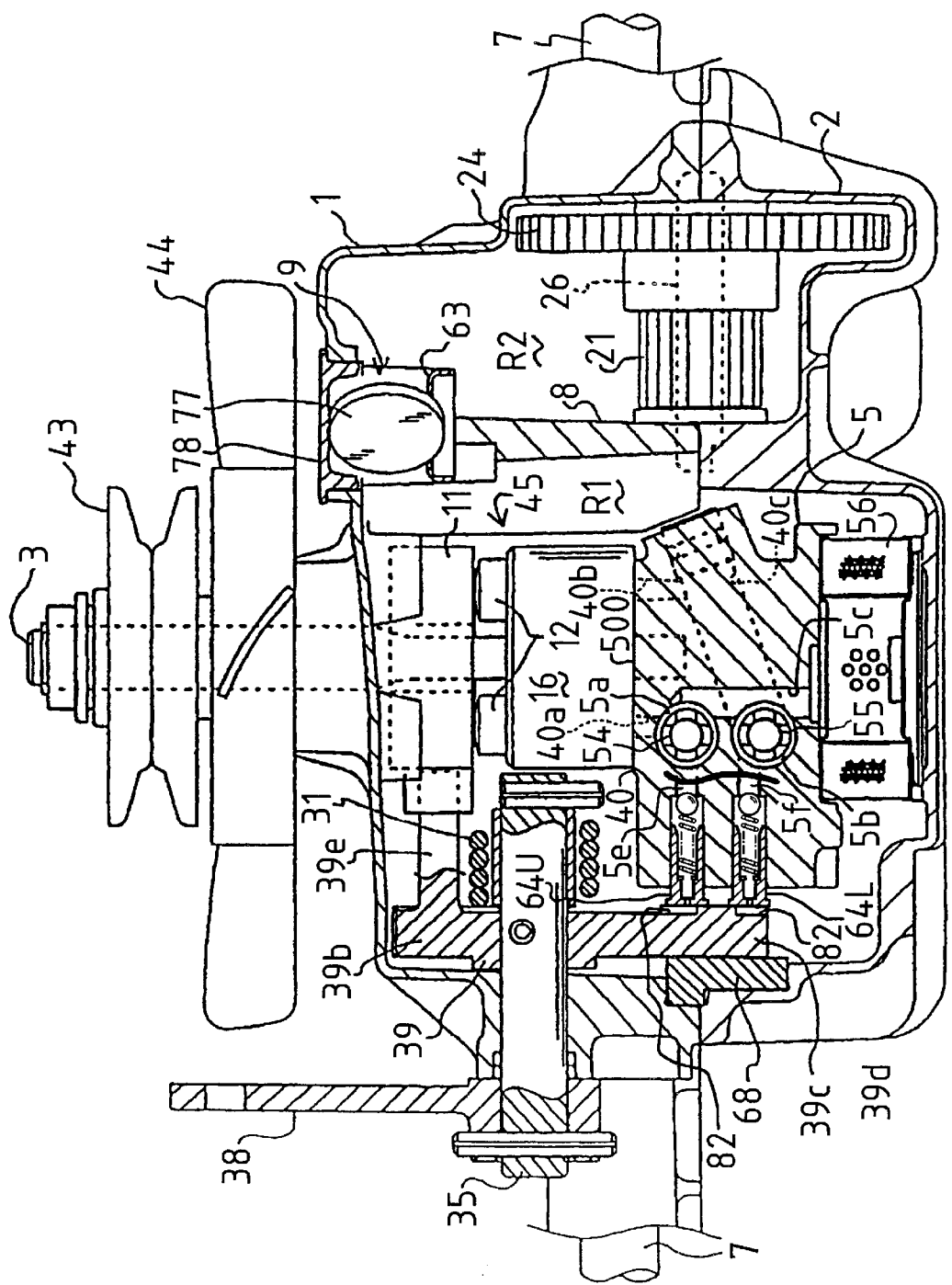
FIG. 2 is a cross-sectional view taken on line II—II of FIG. 1.
Figure 3:
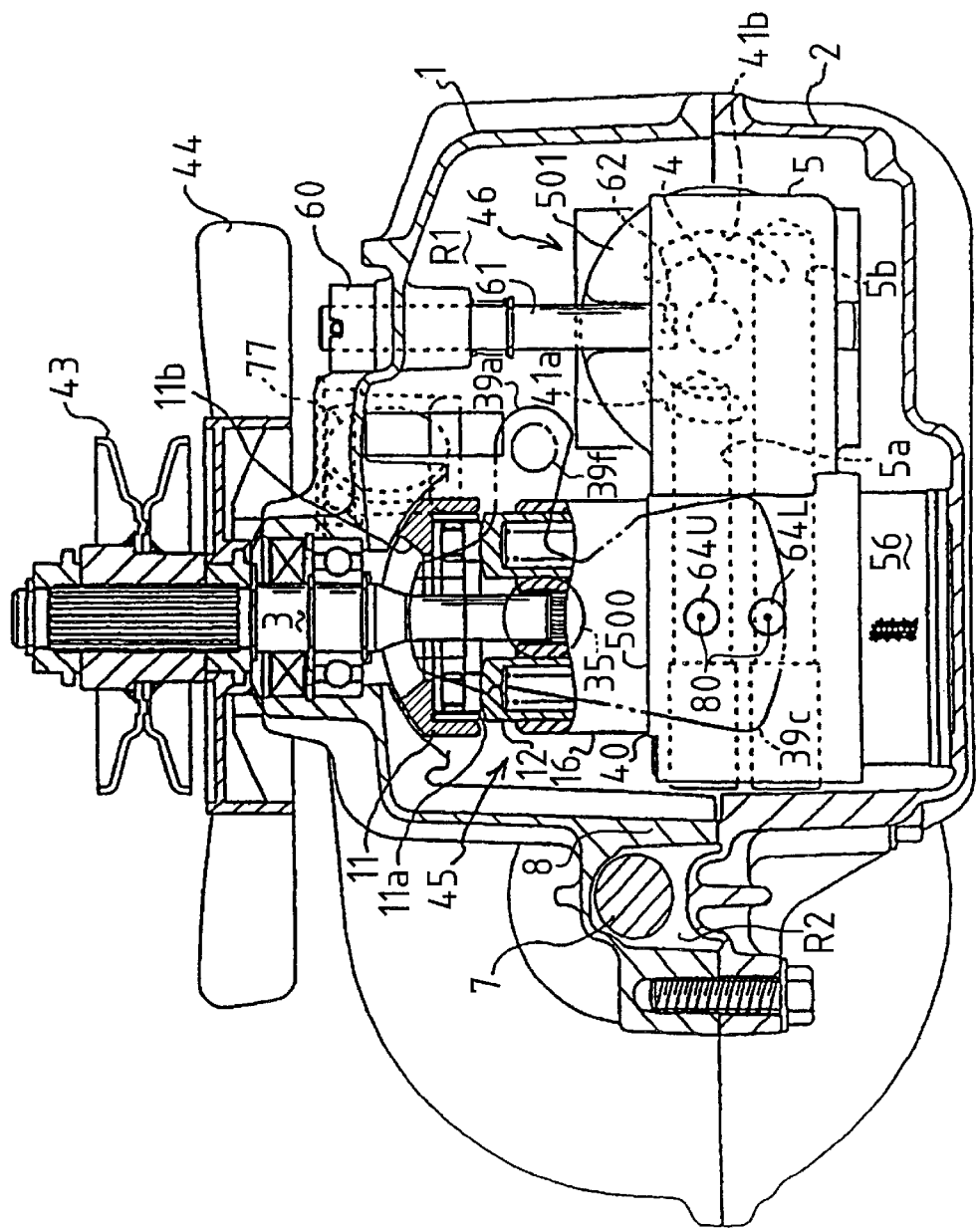
FIG. 3 is a cross-sectional view taken on line III—III of FIG. 1.

As shown in FIGS. 2 and 3, a housing is constituted by joining an upper housing part 1 and a lower housing part 2 through a horizontal joint surface. A bearing portion for a motor shaft 4 is provided on the horizontal joint surface between upper and lower housing parts 1 and 2. Bearing portions for a pair of axles 7 are provided in upper housing part 1 so as to be located above the horizontal joint surface. Axles 7 rotatably supported by the bearing portions of upper housing part 1 project laterally outward. In the housing, a differential gear unit 23 differentially connects axles 7 with each other.

A partition wall 8 is formed in the housing so as to divide the interior space of the housing into a first chamber R1 and a second chamber R2. As shown in FIG. 1, an HST is disposed in first chamber RI. Differential gear unit 23, a gear train interposed between motor shaft 4 and differential gear unit 23 and axles 7 are disposed in second chamber R2.

First and second chambers R1 and R2 are filled with common lubrication oil, thereby serving as oil sumps. This lubrication oil is also used as hydraulic oil for the HST as discussed later. As shown in FIG. 2, both chambers R1 and R2 communicate with each other through a passage 9, thereby allowing lubrication oil to flow between both chambers R1 and R2. An upward open end of passage 9 is plugged by a lid 78. A seat 63 is disposed at a bottom portion of passage 9. An oil filter 77 is disposed between lid 78 and seat 63 so as to remove impurities such as iron powders caused by gear-meshing in both chambers R1 and R2 from the oil.

A center section 5 is disposed in first chamber R1. Center section 5 has a horizontal portion 500 and a vertical portion 501 so as to be d-like shaped, when viewed in side.

Horizontal portion 500 is formed at its upper surface with a pump mounting surface 40. A cylinder block 16 is slidably rotatably mounted on pump mounting surface 40. Cylinder block 16 is formed therein with a plurality of cylinder holes into which respective pistons 12 are reciprocally inserted through respective biasing springs. Heads of pistons 12 abut against a thrust bearing 11a of a movable swash platen serving as an output regulating device of the HST. Movable swash plate 11 is provided at its middle portion with an opening 11b which allows a pump shaft 3 to pass therethrough. Pump shaft 3, which is also used as an input shaft, is vertically disposed on a rotational axis of cylinder block 16 and not-relatively rotatably engaged with cylinder block 16. Thus, an axial piston type variable displacement hydraulic pump 45 is constructed.

Pump shaft 3 passed through movable swash plate 11 projects upward from upper housing part 1 so as to be fixedly provided thereon with an input pulley 43 together with a cooling fan 44. Power of a prime mover (not shown) is transferred into input pulley 43 through a belt type transmission (not shown). The power is introduced into the housing through pump shaft 3 so as to drive hydraulic pump 45.

Vertical portion 501 of center section 5 is provided at its vertical surface with a motor mounting surface 41. A cylinder block 17 is slidably rotatably mounted on motor mounting surface 41. Cylinder block 17 is formed therein with a plurality of cylinder holes into which respective pistons 13 are reciprocally inserted through respective biasing springs. Heads of pistons 13 abut against a fixed swash plate 37 which is fixedly sandwiched between upper and lower housing parts 1 and 2.

Motor shaft 4 is horizontally disposed on a rotational axis of cylinder block 17 and not-relatively rotatably engaged with cylinder block 17, thereby constituting an axial piston type fixed displacement hydraulic motor 46. Motor shaft 4 is rotatably inserted into a bearing hole bored in vertical portion 501 of center section 5. Also, motor shaft 4 is journalled at its intermediate portion by a bearing 4a with a seal provided in partition 8 on the joint surface between upper and lower housing parts 1 and 2 so as to be extended into second chamber R2.

The gear train for transferring power from motor shaft 4 to differential gear unit 23 will be described in accordance with FIG. 1. In second chamber R2, a counter shaft 26 is disposed in parallel to motor shaft 4. A diametrically smaller gear 21 is provided on counter shaft 26 and a diametrically larger gear 24 is not-relatively rotatably fitted on diametrically smaller gear 21. A gear 25 fixed on motor shaft 4 engages with diametrically larger gear 24. Diametrically smaller gear 21 engages with a ring gear 22 of differential gear unit 23. Ring gear 22 is rotated so as to drive differential gear unit 23, thereby transferring power to left and right axles 7.

A brake disc 19 is fixed on an end portion of motor shaft 4 in second chamber R2. A brake operation shaft 14 is vertically disposed and rotatably supported by upper housing part 1. In the housing, brake operation shaft 14 is formed at its one end portion into a sectionally D-like shaped cam. A brake arm (not shown) is fixed to the other end portion of brake operation shaft 14 outside the housing. Brake disc 19 is disposed between brake pads 18 and 29. A back surface of brake pad 18 is disposed adjacent to the D-like shaped cam of brake operation shaft 14.

Due to this construction, by rotating the brake arm, brake operation shaft 14 is rotated so as to press its cam against brake pad 18, thereby bringing brake disc 19 into frictional contact with both brake pads 18 and 29 so as to brake motor shaft 4 frictionally.

A hydraulic oil circuit formed in center section 5 of the HST will be described.

An upper oil passage hole 5a and a lower oil passage hole 5b are horizontally formed in a vertical row in center section 5. As shown in FIG. 2, a pair of ports 40a and 40b, which are arcuate when viewed in plan, are open at pump mounting surface 40. Port 40a communicates with upper oil passage hole 5a. Port 40b communicates with lower oil passage hole 5b through a slant oil passage hole 40c. As shown in FIG. 3, a pair of arcuate ports 41a and 41b are open at motor mounting surface 41. Port 41a communicates with upper oil passage hole 5a. Port 41b communicates with lower oil passage hole 5b. Ports 40a and 41a and upper oil passage hole 5a serves as a first hydraulic oil passage. Lower oil passage hole 5b, slant oil passage hole 40c and ports 40b and 41b serve as a second hydraulic oil passage. The pair of first and second hydraulic oil passages constitute a hydraulic oil circuit for the HST (an HST circuit).

The hydraulic oil circuit can be fed with hydraulic oil as follows:

In horizontal portion 500 of center section 5, an oil feeding hole 5c is bored downward from upper oil passage hole 5a so as to cross lower oil passage hole 5b and open at a lower surface of horizontal portion 500. A ring-shaped oil filter 56 is disposed between the lower surface of horizontal portion 500 and the inner bottom surface of lower housing part 2 so as to surround the bottom opening of oil feeding hole 5c. A check valve 54 is disposed at a joint portion of oil feeding hole 5c with upper oil passage hole 5a. A check valve 55 is disposed at a joint portion of oil feeding hole 5c with lower oil passage hole 5b. Each of check valves 54 and 55 is opened only when hydraulic oil is fed into each of upper and lower oil passage holes 5a and 5b.

Hydraulic oil is introduced from the oil sump of the housing into oil feeding hole 5c in center section 5 through oil filter 56. Then, the hydraulic oil in oil feeding hole 5c is fed into a lower-pressured one of oil passage holes 5a and 5b through a corresponding one of check valves 54 and 55. Oil feeding hole 5c also functions as a draining hole from the first and second hydraulic oil passages respectively at need.

A pair of oil holes 5e and 5f are branched from upper and lower hydraulic oil passage holes 5a and 5b, respectively, so as to be aligned in a vertical row. Oil holes 5e and 5f are open at the same outer side surface of horizontal portion 500 of center section 5. Upper and lower pistons 64U and 64L are reciprocally inserted into the opening ends of respective oil holes 5e and 5f. A later-discussed contact plate 39c of a control arm 39 is disposed outside center section 5 so as to face tips of pistons 64U and 64L. As discussed later, each of pistons 64U and 64L is pressed against contact plate 39c by pressure of oil in each of the first and second hydraulic oil passages so as to frictionally resist control arm 39.

When a vehicle having this axle driving apparatus is hauled, oil can be drained from the HST circuit so as to allow axles 7 to be freely rotatable. As shown in FIG. 3, an draining operation lever 60 is disposed above upper housing part 1 and fixed onto a vertical draining shaft 61 rotatably supported by upper housing part 1. In the housing, draining shaft 61 is extended downward into the vicinity of vertical portion 501 of center section 5. The lower end of draining shaft 61 is formed into a cam (not shown). A thrust pin 62 is axially slidably supported by vertical portion 501. One end of thrust pin 62 is arranged adjacent to the cam of draining shaft 61. The other end of draining shaft 61 is arranged adjacent to the surface of cylinder block 17 which slidably rotatably abuts against motor mounting surface 41. A draining operation lever 60 is fixed onto the top end portion of draining shaft 61 outside the housing.

If draining operation lever 60 is rotated, draining shaft 61 is rotated so that its cam pushes thrust pin 62 so as to separate cylinder block 17 from motor mounting surface 41. Thus, oil is drained to the oil sump from the first and second hydraulic oil passages in center section 5 through arcuate ports 41*a* and 41*b*, thereby allowing motor shaft 4 to be freely rotatable.

Movable swash plate 11 of hydraulic pump 45 is allowed to be manually rotated. A horizontal control shaft 35 is rotatably supported by a side wall of upper housing part 1. A control lever 38 is fixed onto control shaft 35 outside the housing. Control lever 38 is interlockingly connected through an adequate linkage to a speed changing operation device (not shown), e.g., a speed changing pedal, provided in the vicinity of an operator's seat of a vehicle.

In the housing, a base portion of control arm 39 is fixed onto an inner end of control shaft 35 interlocking with movable swash plate. First and second arm 39*a* and 39*b* are radically extended from the base portion of control arm 39. Also, control arm 39 is formed with a sectorial plate-shaped contact plate 39*c*. As shown in FIGS. 1 and 3, first arm 39*a* is substantially horizontally extended perpendicularly to axles 7. An engaging pin 39*f* projects from an utmost end portion of first arm 39*a*. As shown in FIG. 3, second arm 39*b* is extended substantially upward. An engaging portion 39*e* integrally projects from an utmost end portion of second arm 39*b* so as to be engaged with a side portion of movable swash plate 11. Thus, control shaft 39 is interlockingly connected to movable swash plate 11 through control arm 39.

Accordingly, control lever 39 is rotated in a longitudinal direction of the vehicle centering control shaft 35 so as to rotate control arm 39 integrally, thereby swinging movable swash plate 11.

An eccentric shaft 33 projects inward from the side wall of upper housing part 1. A neutral-return spring 31 which is a twisted coiled spring is wound around control shaft 35. Both end portions of neutral-return spring 31 are crossed with each other, twisted and extended along first arm 39*a* so as to sandwich engaging pin 39*f* and eccentric shaft 33 there between.

Due to this structure, when control lever 38 is rotated from its neutral position for swinging movable swash plate 11, control arm 39 is rotated so that engaging pin 39*f* on first arm 39*a* moves to push one end portion of neutral-return spring 31 apart from the other end portion of neutral-return spring 31 held by eccentric shaft 33. In this condition, the end portion of neutral-return spring 31 pushed by engaging pin 39*f* applies a neutral-returning force onto engaging pin 39*f*. Thus, when control lever 38 is loosened, control arm 39 is returned to its neutral position by this neutral-returning force so as to return movable swash plate 11 and control lever 38 to their neutral positions.

Eccentric shaft 33 is integrally extended from its central shaft portion 33*a* rotatably supported in the side wall of upper housing part 1. Axes of eccentric shaft 33 and central shaft portion 33*a* are parallel to each other. Central shaft portion 33*a* projects outward from upper housing part 1 so as to be formed into an adjusting screw 33*b*. A nut 34 is screwed around adjusting screw 33*b* so as to fasten eccentric shaft 33 to upper housing part 1. For adjusting the neutral position of movable swash plate 11, nut 34 is rotated so as to allow central shaft portion 33*a* to be freely rotatable in the side wall of upper housing part 1, thereby enabling the position of eccentric shaft 33 to be adjusted.

The HST is provided with a hydraulic pressure regulating device as an internal damper, which comprises pistons 64U and 64L disposed in a pair of oil holes 5*e* and 5*f* extended from upper and lower oil passage holes 5*a* and 5*b*, and contact plate 39*c* of control arm 39.

A preferred embodiment of the hydraulic pressure regulating device will be described in accordance with FIGS. 4 to 6.

Figure 4:
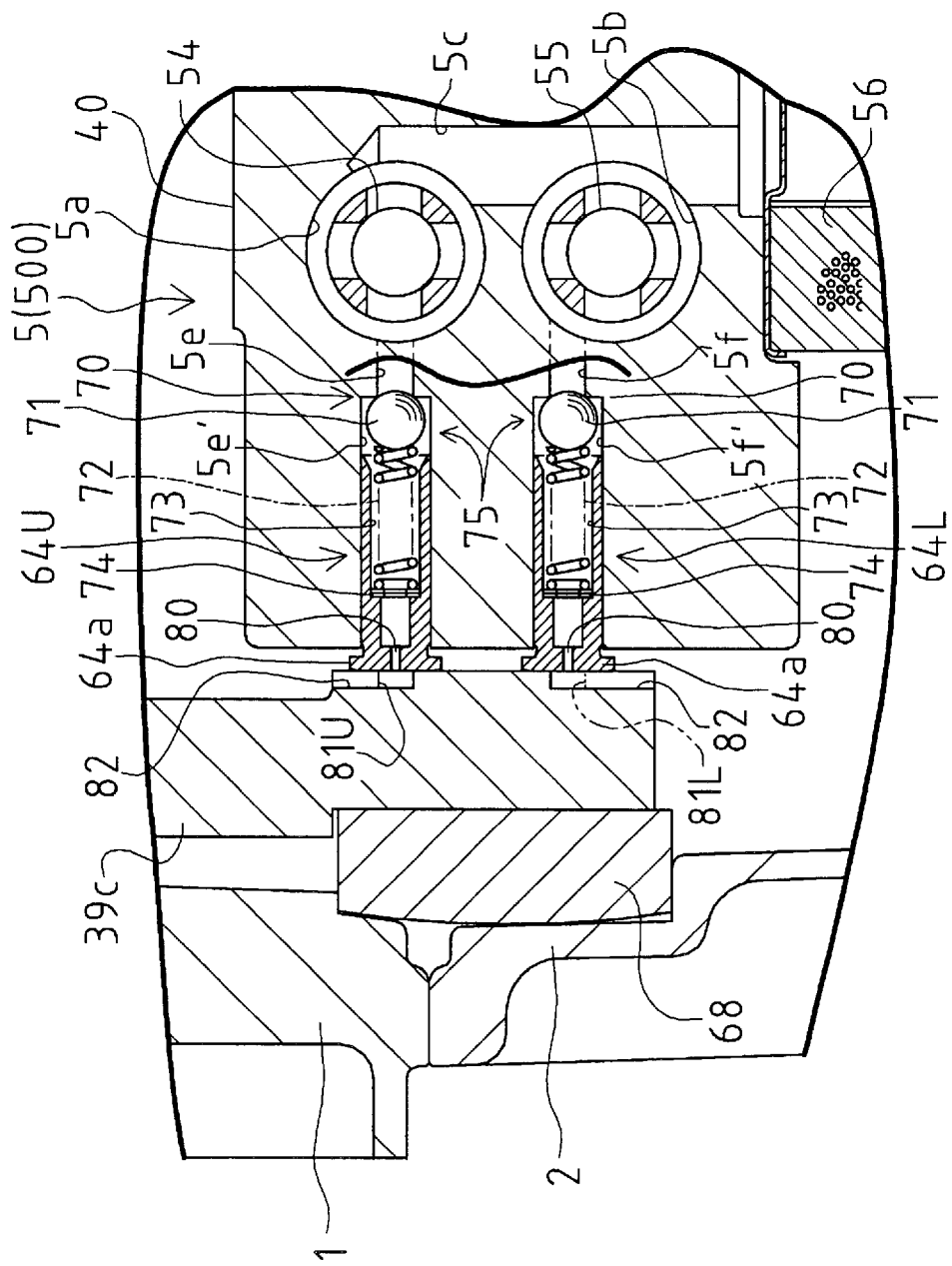
FIG. 4 is an enlarged sectional view of a pressure regulating device including pistons and a contact plate of a control arm according to a basic embodiment of the present invention.

As shown in FIGS. 4, oil hole 5*e* connected to upper oil passage hole 5*a* of the first hydraulic oil passage is formed at its intermediate portion with a step 70. A portion 5*e*' of oil hole 5*e* between the open end and step 70 is expanded so as to be diametrically larger than the other portion of oil hole 5*e*. Similarly, oil hole 5*f* connected to lower oil passage hole 5*b* of the second hydraulic oil passage is formed with step 70 and a diametrically larger expanded portion 5*f*'.

In each of expanded portions 5*e*' and 5*f*' of oil holes 5*e* and 5*f*, a valve ball 71 made of steel, for example, is disposed at step 70 so as to open or close each of expanded portions 5*e*' and 5*f*' to and from each of the first and second hydraulic oil passages. Each of pistons 64U and 64L is reciprocally and oil-tightly inserted into each of expanded portions 5*e*' and 5*f*' of oil holes 5*e* and 5*f*. A tip of each of pistons 64U and 64L outside center section 5 is formed into a flange portion 64*a* having a vertical flat end surface.

Each of pistons 64U and 64L are hollowed at a certain length with a spring hole 73 from the end thereof toward valve ball 71. In each spring hole 73, a shim plate 74 is disposed at the most recessed end surface of spring hole 73. A biasing spring 72 is inserted into spring hole 73 of each of pistons 64U and 64L so as to be extended between shim plate 74 and valve ball 71. Thus, each valve ball 71 is biased by spring 72 so as to abut against step 70 serving as a valve seat, thereby constituting a relief valve 75, which is opened when the hydraulic pressure in the corresponding one of the first and second hydraulic oil passages exceeds a predetermined degree. Shim plate 74 may be multiple so that the number of shim plates 74 is allowed to vary.

Variation of shim plate 74 in its number or kind contributes to adjustment of the biasing force of spring 72 for regulating the pressure for operation of relief valve 75 (i.e., the relief pressure of relief valve 75).

Incidentally, valve ball 71, spring 72, relief valve 75 and so on in expanded portion 5*e*' of upper oil hole 5*e* are particularly referred to as upper valve ball 71, upper spring 72, upper relief valve 75 and so on. Also, valve ball 71, spring 72, relief valve 75 and so on in expanded portion 5*f*' of lower oil hole 5*f* are particularly referred to as lower valve ball 71, lower spring 72, lower relief valve 75 and soon.

Each of pistons 64U and 64L is bored along its axis from its tip surface with an outwardly open orifice 80. In each of pistons 64U and 64L, a diametrically intermediate large hole, whose diameter is larger than that of orifice 80 and smaller than that of spring hole 73, is interposed between orifice 80 and spring hole 73.

Relief valve 75 also functions as a check valve so as to prevent oil in the oil sump of the housing from being absorbed into each of the first and second hydraulic oil passages. For example, even if oil filled in the housing is reduced so as to make the oil level lower than orifice 80 of upper piston 64U, the air above the level of the oil sump is prevented from being absorbed into the first hydraulic oil passage by upper relief valve 75.

The diameters of orifices 80 must be sufficiently large so as to soften the shock during deceleration of the vehicle for stopping. Besides, they must be determined under consideration as follows:

When the vehicle is stationary on a slope, the weight of the vehicle applied onto axles 7 functions as potential energy, and therefore motor shaft 4 and hydraulic motor 46 may be driven by the free rotation of axles 7, thereby generating a back-pressure in the HST circuit.

When this back-pressure exceeds the relief pressure for each relief valve 75, one of relief valves 75 is opened so that the oil in the HST circuit is drained into the oil sump of the housing through orifice 80 of either piston 64U or 64L. If the diameter of orifice 80 is excessively large, the large amount of oil is suddenly drained from the HST circuit to the oil sump, thereby reducing the oil in the HST circuit so as to allow hydraulic motor 46 to be free from the hydraulic pressure in the HST circuit. Therefore, hydraulic motor 46 is rotated by its potential energy so that the vehicle descends the slope against an operator's will.

Thus, the diameters of orifices 80 are restricted so that an appropriate amount of the hydraulic oil still remains in the HST circuit so as to prevent hydraulic motor 46 from being easily free from the hydraulic pressure in the HST circuit even if a part of the hydraulic oil whose pressure is increased by the back-pressure is drained through orifice 80 to the oil sump, thereby resisting a possible descent of the vehicle while on the slope.

Contact plate 39c abutting against pistons 64U and 64L is extended downward into the vicinity of the horizontal top surface of horizontal portion 500 of center section 5. Contact plate 39c is rotated interlockingly with control shaft 35. The width of the sector form of contact plate 39c centering control shaft 35 is determined so that contact plate 39c faces both pistons 64U and 64L while contact plate 39c is rotated at a whole of its rotational range from its neutral position to both the maximum speed position in forward driving and the maximum speed position in backward driving.

Figure 5:
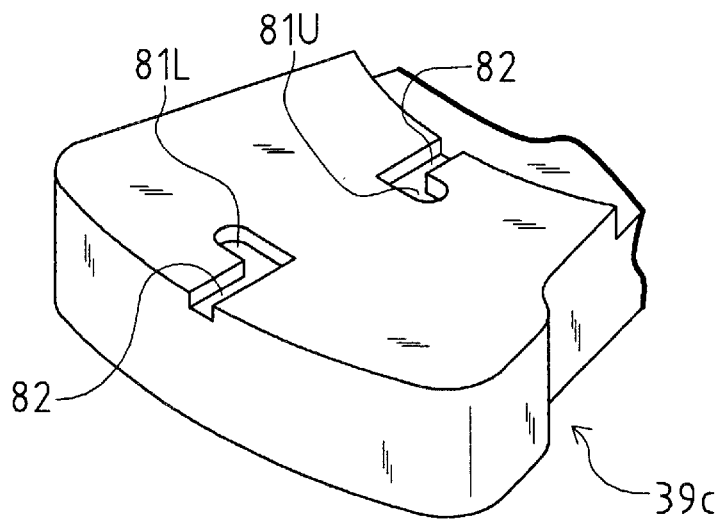
FIG. 5 is a perspective view of the contact plate formed with escaping grooves.

As shown in FIG. 5, a (contact) surface of contact plate 39c facing pistons 64U and 64L is flat. This flat contact surface of contact plate 39c is recessed by escaping grooves 81U and 81L, which are concentrically arcuate centering control shaft 35, in correspondence to respective orifices 80 of pistons 64U and 64L. Also, a drain groove 82 is bored along the contact surface of contact plate 39c so as to be extended from each of escaping grooves 81U and 81L in the radial direction centering control shaft 35 and opened to the oil sump of the housing through each of upper and lower edges of contact plate 39c. Drain grooves 82 from respective escaping grooves 81U and 81L are particularly referred to as upper and lower drain grooves 82, respectively.

As shown in FIGS. 2 and 4, a retaining plate 68 is disposed adjacent to another surface of contact plate 39c which is opposite to the contact surface. Retaining plate 68 is fixedly engaged in a recess formed on an inner wall of the housing. If either piston 64U or 64L is thrust out by the increased hydraulic pressure in the corresponding one of the first and second hydraulic oil passages so as to abut against the contact surface of contact plate 39c, contact plate 39c comes to be pressed between retaining plate 68 and thrust-out piston 64U or 64L, thereby generating a frictional resistance force against the biasing force of neutral-return spring 31.

When movable swash plate 11 is disposed in the vicinity of its neutral position, orifices 80 of pistons 64U and 64L are communicated with escaping grooves 81U and 81L. In this condition, hydraulic oil in the higher-pressured one of the first and second hydraulic oil passages pushes valve ball 71 in either piston 64U or 64L so as to be drained into the oil sump through orifice 80, either escaping groove 81U or 81L and draining groove 82.

The rotational angle range of control shaft 35 wherein hydraulicoil in the HST circuit is drained to the oil sump through orifice 80 maybe be adequate by designing the positions and lengths of escaping grooves 81U and 81L appropriately. In this embodiment, when control shaft 35 is rotated for forward driving of the vehicle, upper piston 64U is thrust out. When control shaft 35 is rotated for backward driving of the vehicle, lower piston 64L is thrust out. Correspondingly, as shown in FIG. 5, escaping groove 81U is constructed so as to communicate with orifice 80 of upper piston 64U when contact plate 39c is located in a certain rotational angle range for low-speed forward driving of a vehicle in the vicinity of its neutral position. Also, escaping groove 81U is constructed so that orifice 80 of upper piston 64U is shut by the contact surface of contact plate 39c when contact plate 39c is located at a rotational angle range for high-speed forward driving a vehicle over the certain rotational angle range for low-speed forward driving of a vehicle and at a whole rotational angle range for backward driving of a vehicle. Groove 81L is constructed so as to communicate with orifice 80 of lower piston 64L when contact plate 39c is located in a certain rotational angle range for low-speed backward driving of a vehicle in the vicinity of its neutral position. Also, escaping groove 81L is constructed so that orifice 80 of lower piston 64L is shut by the contact surface of contact plate 39c when contact plate 39c is located at a rotational angle range for high-speed backward driving a vehicle over the certain rotational angle range for low-speed backward driving of a vehicle and at a whole rotational angle range for forward driving of a vehicle.

Due to this construction, when the speed changing operational device is manually operated from its neutral position so as to rotate control lever 38, control arm 39 is rotated so as to swing movable swash plate 11 to the corresponding operational position, whereby hydraulic pump 45 starts discharging hydraulic oil. The discharged oil flows into hydraulic motor 46 through one of the first and second hydraulic oil passages so as to drive hydraulic motor 46 and motor shaft 4, thereby driving axles 7. The higher-pressured one of the first and second hydraulic oil passages is further pressured by load applied on axles 7. When the hydraulic pressure in the higher-pressured first or second hydraulic oil passage exceeds a predetermined degree which is determined by the biasing force of spring 72, corresponding valve ball 71 is pushed by this hydraulic pressure so as to open relief valve 75, whereby either corresponding piston 64U or 64L is thrust out and pressed against contact plate 39c of control arm 39. Hence, a frictional force is applied onto contact plate 39c so as to resist to the rotation of control shaft 35.

When the rotational angle of movable swash plate 11 exceeds the above-mentioned certain rotational angle for low-speed driving, pistons 64U and 64L are brought into contact with the contact surface of contact plate 39c so that both orifices 80 are shut from escaping grooves 81U and 81L. Therefore, while one of relief valves 75 is opened, the hydraulic oil in the higher-pressured hydraulic oil passage is not drained through corresponding orifice 80, thereby keeping an appropriate volumetric efficiency in the HST.

Suppose that the speed changing operation device is suddenly loosened during forward driving of the vehicle. In this case, control shaft 35 is returned to its neutral position by the function of neutral-return spring 31. Upper piston 64U in communication with the higher-pressured first hydraulic oil passage is pressed against contact plate 39c so as to generate a friction force against the neutral-returning of control arm 39. Therefore, control shaft 35 is returned to the neutral position slowly while being braked by the friction force. That is, control shaft 35 is prevented from sudden neutral-returning so as to avoid a vigorous dynamic brake of the HST.

When control shaft 35 returns from the set forward driving speed position into the certain rotational angle range for low-speed forward driving in the vicinity of the neutral position, orifice 80 of upper piston 64U is brought into communication with escaping groove 81U. Accordingly, if the residual pressure in the higher-pressured first hydraulic oil passage still exceeds the relief pressure of upper relief valve 75, upper valve ball 71 is pushed by the hydraulic oil from upper oil passage hole 5a so as to open upper relief valve 75, so that the hydraulic oil in the first hydraulic oil passage is drained to the oil sump through orifice 80 of upper piston 64U, escaping groove 81U and upper draining groove 82, thereby adequately softening the shock when the vehicle stops.

Suppose that the speed changing operation device is suddenly loosened during backward driving of the vehicle. Lower piston 64L in communication with the higher-pressured second hydraulic oil passage is pressed against contact plate 39c so as to generate a friction force against the biasing force of neutral-return spring 31 for neutral-returning of control arm 39. Therefore, control shaft 35 is returned to the neutral position slowly while being braked by the friction force. That is, control shaft 35 is prevented from sudden neutral-returning so as to avoid a vigorous dynamic brake of the HST.

When control shaft 35 returns from the set backward driving speed position into the certain rotational angle range for low-speed backward driving in the vicinity of the neutral position, orifice 80 of lower piston 64L is brought into communication with escaping groove 81L. Accordingly, if the residual pressure in the higher-pressured second hydraulic oil passage still exceeds the relief pressure of lower relief valve 75, lower valve ball 71 is pushed by the hydraulic oil from lower oil passage hole 5b so as to open lower relief valve 75, so that the hydraulic oil in the second hydraulic oil passage is drained to the oil sump through orifice 80 of lower piston 64L, escaping groove 81L and lower draining groove 82, thereby adequately softening the shock when the vehicle stops.

Figure 6:
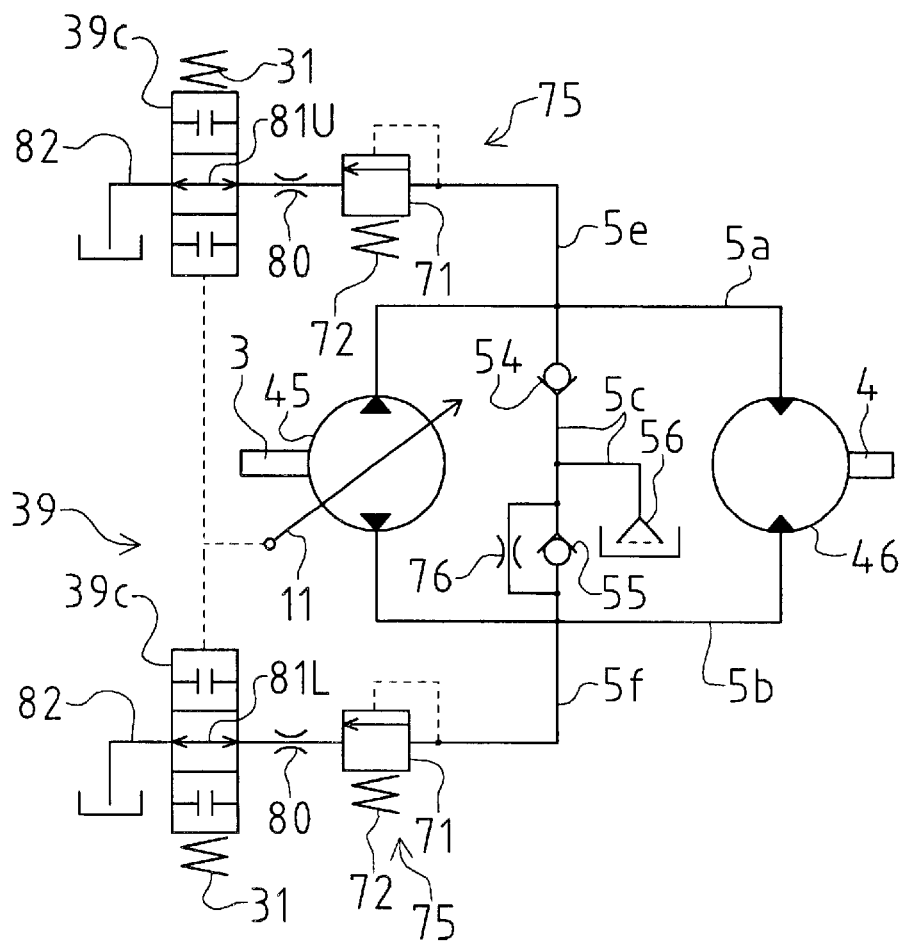
FIG. 6 is a hydraulic circuit diagram of the HST according to the basic embodiment of the present invention.

As shown in the HST hydraulic circuit of FIG. 6, an orifice 76 bypassing check valve 55 is interposed between oil feeding hole 5c and lower oil passage hole 5b of the second hydraulic oil passage which is higher-pressured during backward driving of a vehicle.

Accordingly, when stopping the vehicle driving backward, the residual pressure in the second hydraulic oil passage, which does not escape from orifice 80 of lower piston 64L because it is less than the relief pressure of lower relief valve 75, escapes to upper oil passage hole 5a of the first hydraulic oil passage, which is depressed at this time, through orifice 76 and oil feeding hole 5c. This means that the neutral range of the HST is expanded into the essential backward driving range, thereby facilitating an adjustment of the neutral position of the HST. That is all that is required for adjusting the neutral position of the HST is to rotationally adjust eccentric shaft 33 in the above-mentioned way so as to locate the proper neutral position of movable swash plate 11 at any position in this expanded neutral range.

Figure 8:
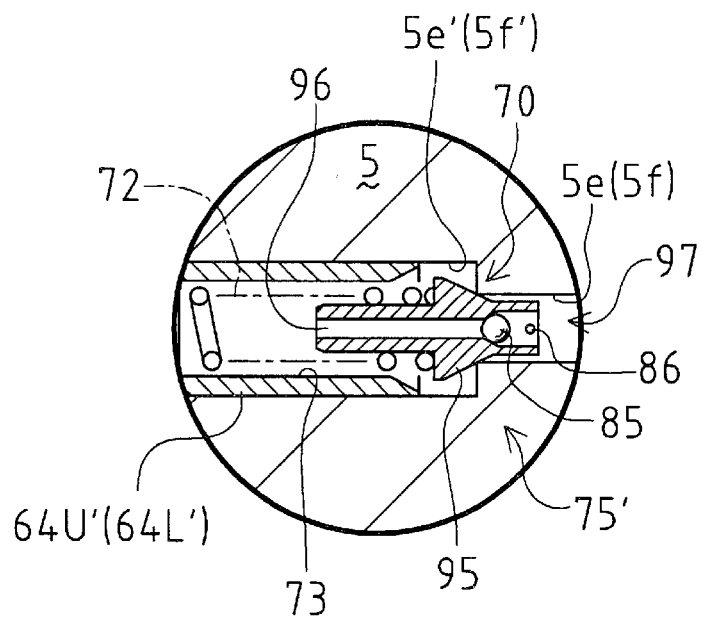
FIG. 8 is an enlarged sectional view of a relief valve of the pressure regulating device according to the first modification of the present invention.
Figure 9:
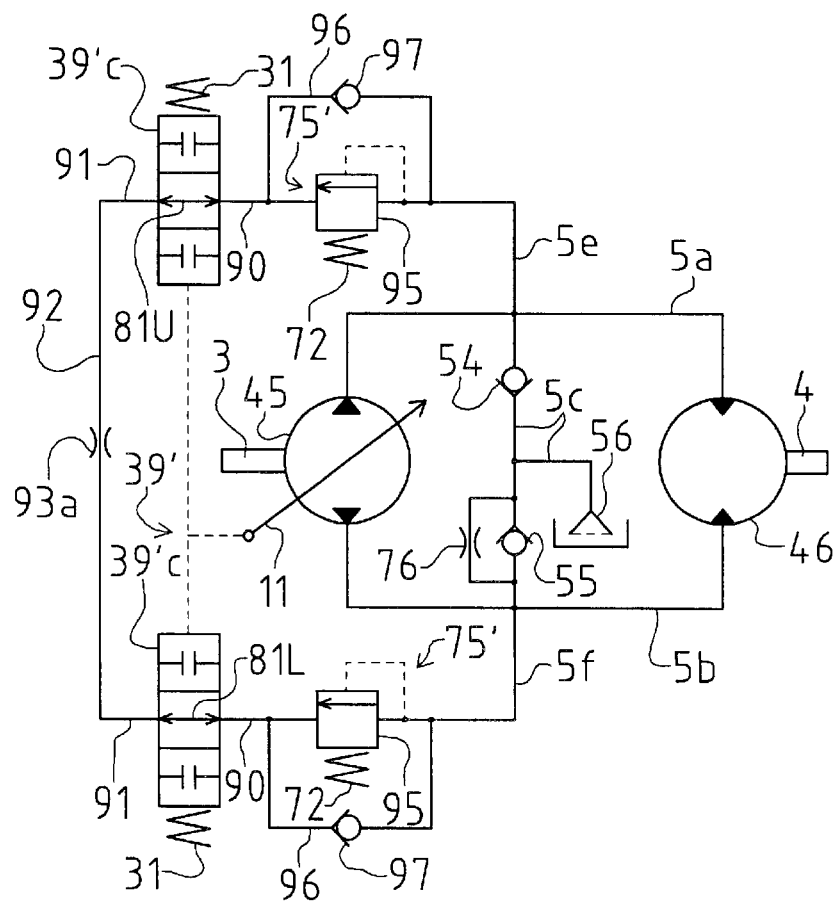
FIG. 9 is a hydraulic circuit diagram of the HST according to the first modification of the present invention.

A first modification of the pressure regulating device will be described in accordance with FIGS. 7 to 9.

The foregoing pistons 64U and 64L and contact plate 39c, which are constructed so as to allow the hydraulic oil in the higher-pressured first or second hydraulic passage to escape to the oil sump, have the problem that the hydraulic oil in the closed HST hydraulic circuit is reduced. The hydraulic oil in the HST hydraulic circuit may become insufficient to drive the HST despite feeding of hydraulic oil into the depressed second or first hydraulic passage through oil feeding hole 5c. At this time, the HST cannot appropriately transfer a driving force to axles 7.

According to the first modification of the pressure regulating device, the hydraulic oil in the higher-pressured first or second hydraulic oil passage is not drained to the oil sump but is returned to the lower-pressured second or first hydraulic oil passage, whereby the quantity of hydraulic oil in the whole of the HST circuit is maintained.

Figure 7:
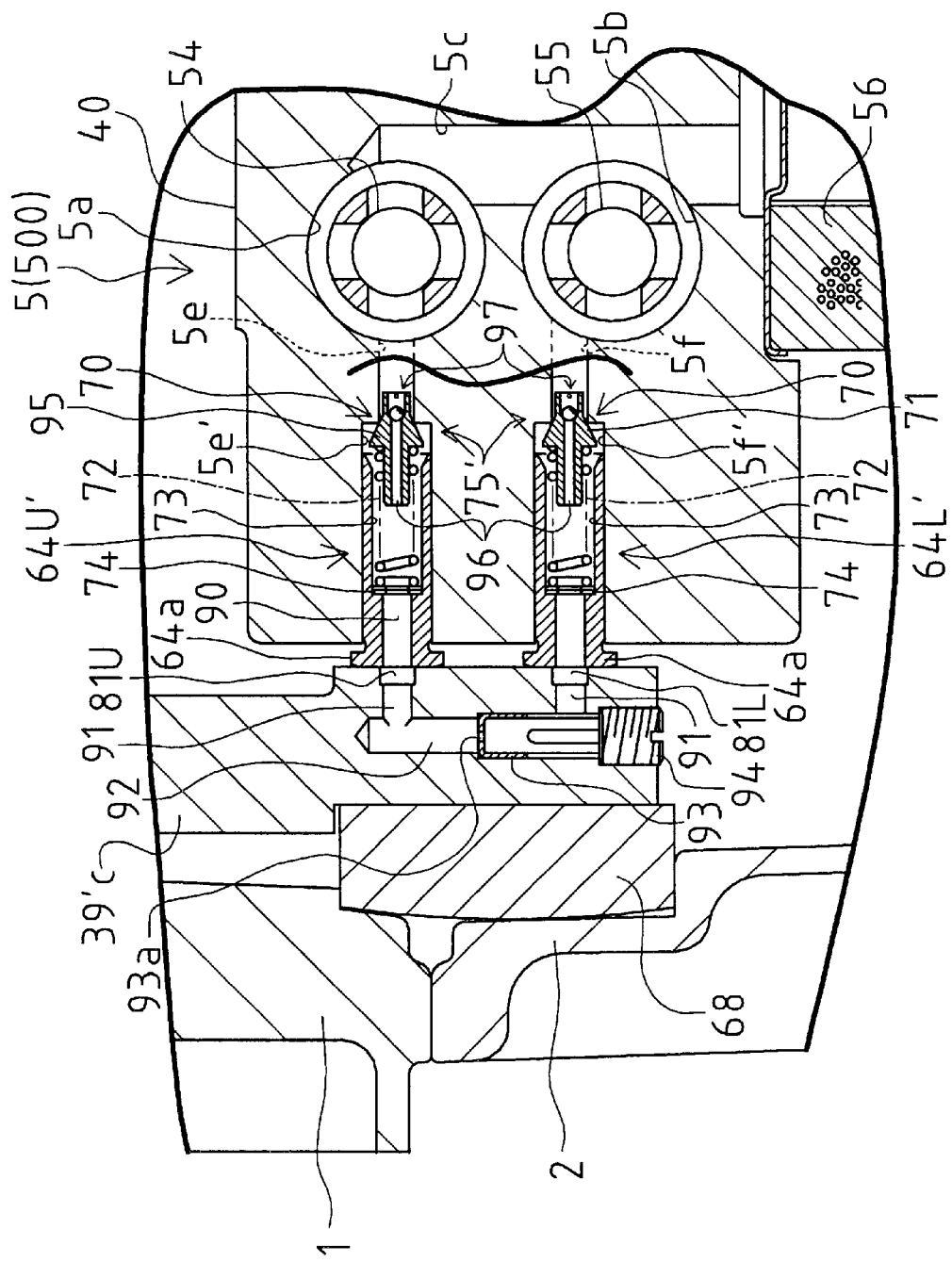
FIG. 7 is an enlarged sectional view of a pressure regulating device of an HST according to a first modification of the present invention.

As shown in FIG. 7, upper and lower pistons 64U' and 64L' as modified pistons 64U and 64L have as the only different point from pistons 64U and 64L that each of pistons 64U' and 64L' has an outwardly open hole 90 replacing orifice 80. Hole 90 is diametrically larger than orifice 80 and smaller than spring hole 73. The diameter of hole 90 maybe substantially as large as that of the intermediate hole between orifice 80 and spring hole 73 in each of pistons 64U and 64L.

Instead of draining grooves 82, contact plate 39'c as a modified constant plate 39c is drilled therein with a pair of upper and lower oil holes 91 from respective escaping grooves 81U and 81L so that oil holes 91 are extended in perpendicular to the contact surface of contact plate 39'c. Furthermore, contact plate 39'c is drilled therein with a bypass hole 92 in parallel to the contact surface of contact plate 39'c. Oil holes 91 are connected to bypass hole 92. An orifice member 93 having an orifice 93a is inserted into bypass hole 92 and the open end of bypass hole 92 is plugged by a plug 94.

The shape and position of escaping grooves 81U and 81L on the contact surface of contact plate 39'c are designed so that when hole 90 of upper piston 64U' communicates with escaping groove 81U, hole 90 of lower piston 64L' necessarily communicates with escaping groove 81L.

Each of relief valves 75' replacing relief valve 75 is constructed in each of oil holes 5e and 5f so that a valve member 95 replacing valve ball 71 is biased by spring 72 so as to abut against step 70. Valve member 95 is a cylindrical member with a tapered flange to retain spring 72 and to be pressed against step 70. As shown in FIG. 8, valve member 95 is axially penetrated by a diametrically small path 96 which is expanded at its end portion toward the HST circuit so as to be diametrically larger. A small valve ball 85 made of steel, for example, is disposed in the expanded end portion of path 96, thereby constituting a check valve 97. A retaining pin 86 projects from valve member 95 in the expanded end portion of path 96 so as to prevent valve ball 85 from escaping from path 96. Check valve 97 allows oil to flow from hole 90 to the HST circuit and checks the reverse flow.

Due to this construction, when the speed changing operational device is manually operated from its neutral position so as to rotate control lever 38, control arm 39' is rotated so as to swing movable swash plate 11 to the corresponding operational position, whereby hydraulic pump 45 starts discharging hydraulic oil. The discharged oil flows into hydraulic motor 46 through one of the first and second hydraulic oil passages so as to drive hydraulic motor 46 and motor shaft 4, thereby driving axles 7. The higher-pressured one of the first and second hydraulic oil passages is further pressured by load applied on axles 7. When the hydraulic pressure in the higher-pressured first or second hydraulic oil passage exceeds a predetermined degree which is determined by the biasing force of spring 72, corresponding valve member 95 is pushed by this hydraulic pressure so as to open relief valve 75', whereby either corresponding piston 64U' or 64L' is thrust out and pressed against contact plate 39'c of control arm 39'. Hence, a frictional force is applied onto contact plate 39'c so as to resist the rotation of control shaft 35.

When the rotational angle of movable swash plate 11 exceeds the above-mentioned certain rotational angle for low-speed driving, pistons 64U' and 64L' are brought into contact with the contact surface of contact plate 39'c so that both holes 90 are shut from escaping grooves 81U and 81L. Therefore, while one of relief valves 75' is opened, the hydraulic oil in the higher-pressured hydraulic oil passage is not drained through corresponding hole 90, thereby keeping an appropriate volumetric efficiency in the HST.

If the speed changing operation device is suddenly loosened during forward driving of the vehicle, control shaft 35 is returned to its neutral position by the function of neutral-return spring 31. Piston 64U' in communication with the higher-pressured first hydraulic oil passage is pressed against contact plate 39'c so as to generate a friction force against the neutral-returning of control arm 39'. Therefore, control shaft 35 is returned to the neutral position slowly while being braked by the friction force. That is, control shaft 35 is prevented from sudden neutral-returning so as to avoid a vigorous dynamic brake of the HST.

When control shaft 35 returns from the set forward driving speed position into the certain rotational angle range for low-speed forward driving in the vicinity of the neutral position, hole 90 of upper piston 64U' is brought into communication with escaping groove 81U. Simultaneously, hole 90 of lower piston 64L' is also brought into communication with escaping groove 81L. Accordingly, if the residual pressure in the higher-pressured first hydraulic oil passage still exceeds the relief pressure of relief valve 75', valve member 95 in expanded portion 5e' of upper oil hole 5e is pushed by the hydraulic oil from upper oil passage hole 5a so as to open relief valve 75' in upper oil hole 5e, so that the hydraulic oil in the first hydraulic oil passage is introduced from hole 90 of upper piston 64U' into bypass hole 92 through escaping groove 81U and upper oil hole 91 in contact plate 39'c. The hydraulic oil in bypass hole 92 flows into lower piston 64L' through orifice 93a of orifice member 93, lower oil hole 91 and hole 90 of lower piston 64L'. Then, check valve 97 is opened so as to introduce the hydraulic oil in lower piston 64L' into the depressed second hydraulic oil passage.

Thus, in addition of the moderation effect in stopping of the vehicle, the hydraulic oil leaking from the HST circuit through the higher-pressured first or second hydraulic oil passage is introduced into the lower-pressured second or first hydraulic oil passage so as to be recovered into the HST circuit, thereby maintaining the quantity of hydraulic oil in the whole of the HST circuit.

A second modification of the pressure regulating device will be described in accordance with FIGS. 10 to 13. Due to this modification, a relief pressure of a relief valve 75" as a modification of relief valve 75 varies according to the rotational position of a control arm 39" as a modification of control arm 39.

Figure 10:
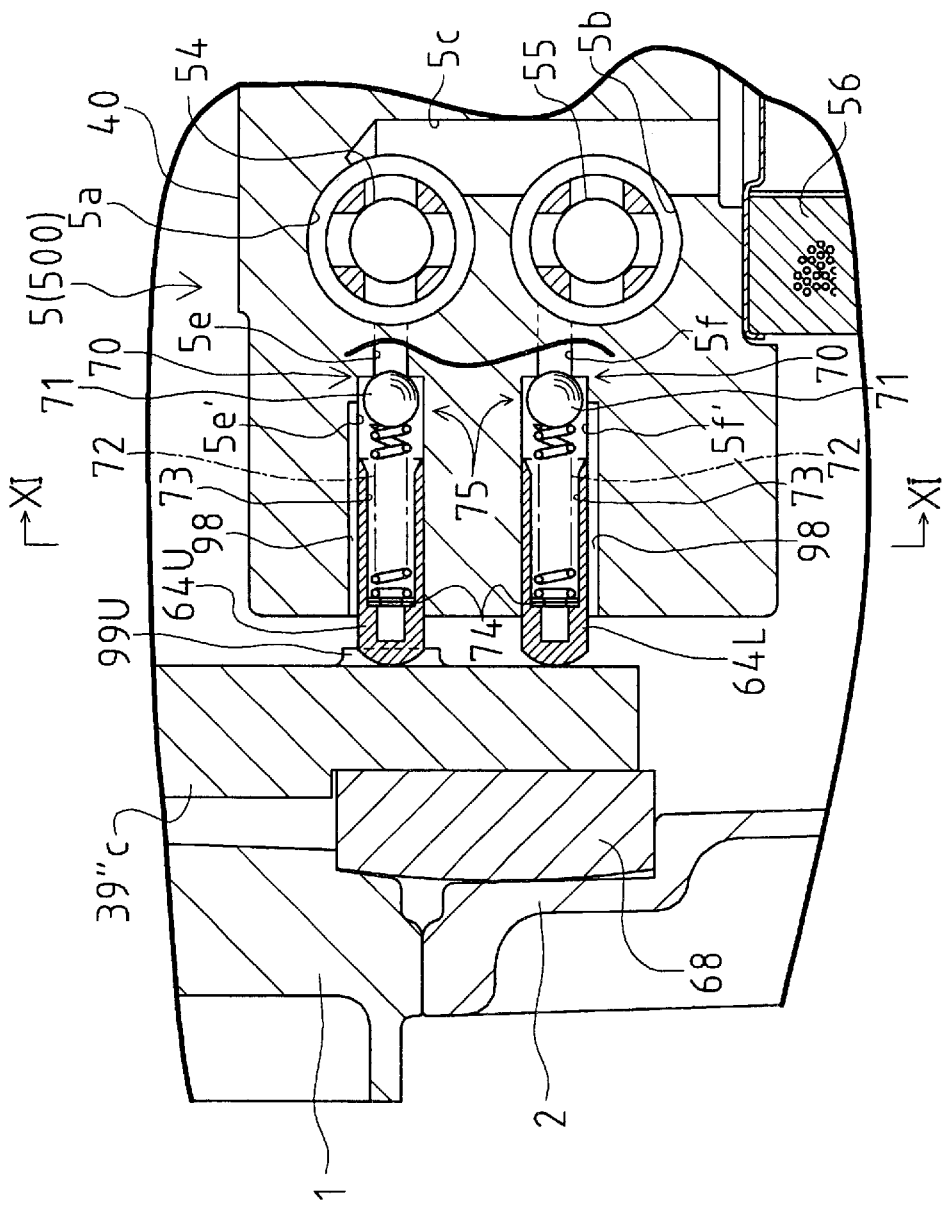
FIG. 10 is an enlarged sectional view of a pressure regulating device of an HST according to a second modification of the present invention.
Figure 11:
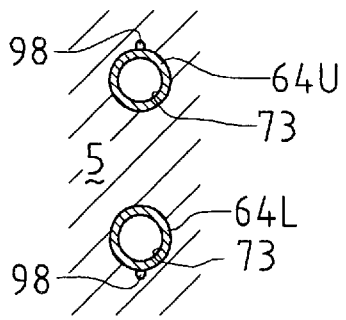
FIG. 11 is a cross-sectional view taken on line XI—XI of FIG. 10.

In this embodiment, as shown in FIG. 10, each of pistons 64U and 64L has no orifice 80 but each of expanded portion 5e' and 5f of oil holes 5e and 5f is provided there along with a narrow oil groove 98 which has approximately the same length of that of each expanded portion 5e' or 5f and is open outward at an outer surface of center section 5. Due to this structure, the hydraulic oil from either the first or second hydraulic oil passage, which pushes valve ball 71 and reaches either expanded portion 5e' or 5f', is drained to the oil sump of the housing through oil groove 98 regardless of positions of pistons 64U and 64L. As shown in FIGS. 10 and 11, narrow oil groove 98 serves as an orifice interposed between the oil sump and each of expanded portion 5e' and 5f' or oil holes 5e and 5f through center section 5, thereby preventing hydraulic oil from being drained in large amounts from oil groove 98 to the oil sump in a short time.

Figure 12:
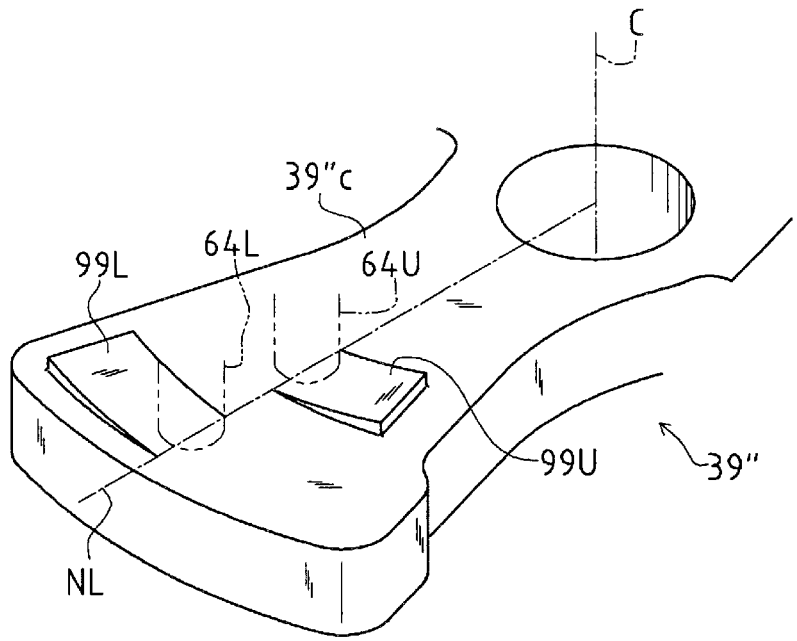
FIG. 12 is a perspective view of a contact plate formed with sloped surfaces according to the second modification of the present invention.

As shown in FIG. 12, contact plate 39"c of control arm 39" according to this embodiment is formed thereon with an upper and lower arcuate slope surface 99U and 99L projecting so as to abut against respective pistons 64U and 64L, without escaping grooves 81U and 81L and draining grooves 82. The arcuate shapes of slope surfaces 99U and 99L, when viewed along a rotational axis C of control arm 39", are concentrically drawn centering rotational axis C along the locus of pistons 64U and 64L in relative to rotating control arm 39".

When control arm 39" is located at its neutral position, it appears on contact plate 39"c that upper slope surface 99U is extended sideward in one direction from a row of pistons 64U and 64L contacting with contact plate 39"c and lower slope surface 99L is extended sideward in the other direction from the row of pistons 64U and 64L. More specified, through a neutral line NL as the row of pistons 64U and 64L when being located at their neutral positions in relative to contact plate 39"c, control plate 39"c is comparted into two sections. In one section of contact plate 39"c with which pistons 64U and 64L contact when control arm 39" is rotated for forward driving of the vehicle, upper sloped surface 99U is formed so as to contact with upper piston 64U. In the other section of contact plate 39"c with which pistons 64U and 64L contact when control arm 39" is rotated for backward driving of the vehicle, lower sloped surface 99L is formed so as to contact with lower piston 64L. Both upper and lower slope surfaces 99U and 99L arises as withdrawing from neutral line NL.

When control arm 39" is rotated from its neutral position for forward driving of the vehicle, upper piston 64U comes to abut at its tip against upper slope surface 99U. According to the rotational degree of control arm 39" from the neutral position, upper slope surface 99U presses upper piston 64U more and more into expanded portion 5e' of oil hole 5e, thereby compressing upper spring 72. This compression of upper spring 72 increases the biasing force of upper spring 72 applied onto upper steel valve 71, thereby increasing the relief pressure of upper relief valve 75. That is, the necessary hydraulic pressure in the first hydraulic oil passage to push upper valve ball 71 so as to open upper relief valve 75 is increased.

When control arm 39" is rotated from its neutral position for backward driving of the vehicle, lower piston 64L comes to abut at its tip against lower slope surface 99L. According to the rotational degree of control arm 39" from the neutral position, lower slope surface 99U presses lower piston 64L more and more into expanded portion 5f' of oil hole 5f, thereby compressing lower spring 72. This compression of lower spring 72 increases the biasing force of lower spring 72 applied onto lower steel valve 71, thereby increasing the relief pressure of lower relief valve 75. That is, the necessary hydraulic pressure in the second hydraulic oil passage to push lower valve ball 71 so as to open lower relief valve 75 is increased.

Each of upper and lower springs 72 is constructed so as to determine the spring force thereof as follows:

When control arm 39" is located at its neutral position so that pistons 64U and 64L are not pressed into oil holes 5e and 5f by upper and lower sloped surfaces 99U and 99L, each of springs 72 is naturally extended or slightly compressed from its natural length state, thereby applying no or extremely slight biasing force onto valve ball 71. Due to this structure, even if either the first or second hydraulic oil passages is slightly higher-pressured because of the wrong adjustment of the neutral position of control shaft 35 with respect to the proper neutral position of movable swash plate 11, the hydraulic oil in the higher-pressured first or second hydraulic oil passage easily pushes valve ball 71 to open relief valve 75 so as to be drained through oil groove 98 to the oil sump, thereby maintaining the equality of hydraulic pressure between the first and second hydraulic oil passages. Of course, in the case that control arm 39" set for forward or backward driving of the vehicle is suddenly returned and reaches the neutral position so as to generate an excessive residual hydraulic pressure in either the first or second hydraulic oil passage, the hydraulic oil in the higher-pressured first or second hydraulic oil passage also pushes valve ball 71 to open relief valve 75 so as to be drained through oil groove 98 to the oil sump, thereby softening the shock when the vehicle stops. This is a first pressure setting condition of the pressure regulating device.

On the other hand, when control arm 39" is rotated from its neutral position so that either piston 64U or 64L is pressed into oil hole 5e or 5f by corresponding slope surface 99U or 99L, spring 72 is compressed sufficiently so as to press valve ball 71 against step 70. This valve ball 71 is not pushed to be separated from step 70, that is, relief valve 75 is not opened even if either corresponding first or second hydraulic oil passage is higher-pressured during the normal operation of the HST. This is a second pressure setting condition of the pressure regulating device.

For establishing such first and second pressure setting conditions, the spring force of springs 72 can be adjusted by selecting the elastic modulus thereof, a length of spring hole 73 in each of pistons 64U and 64L, the number of shim plate 74, the slope angle of each of slope surfaces 99U and 99L and so on.

Figure 13:
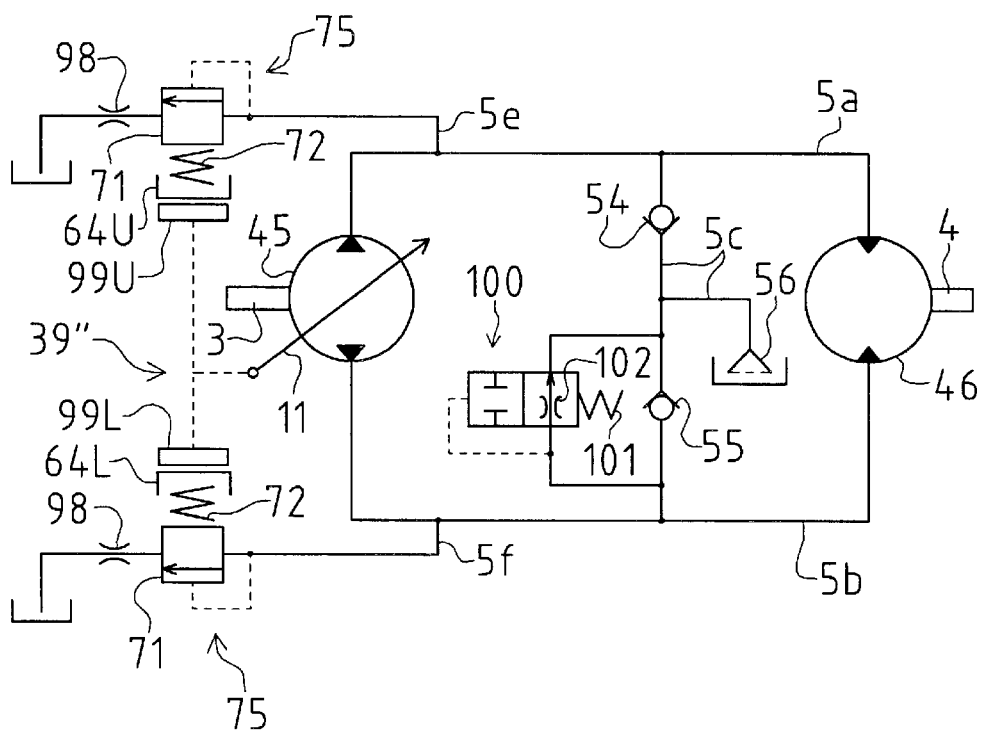
FIG. 13 is a hydraulic circuit diagram of the HST according to the second modification of the present invention.

Referring to the HST circuit according to the second modification, as shown in FIG. 13, a bypass valve 100 bypassing check valve 55 is interposed between oil feeding hole 5c and lower oil passage hole 5b of the second hydraulic oil passage which is higher-pressured during backward driving of the vehicle. Bypass valve 100 provided with a spring 101 is opened so as to release the hydraulic oil in the second hydraulic oil passage to the lower-pressured first hydraulic oil passage including upper oil passage hole 5a through an orifice 102 and oil feeding hole 5c when the hydraulic pressure in the second hydraulic oil passage is less than the pressure determined by spring 101. When the hydraulic pressure in the second hydraulic oil passage is not less than this determined pressure (the closing pressure), bypass valve 100 is closed.

Suppose that control arm 39" is located in the vicinity of its neutral position. ☐Even if movable swash plate 11 is located at a wrong position with respect to its neutral position so that the second hydraulic oil passage is slightly higher-pressured, the hydraulic pressure in the second hydraulic oil passage still remains being less than the closing pressure of bypass valve 100. Therefore, bypass valve 100 is opened so as to introduce the hydraulic oil in the higher-pressured second hydraulic oil passage to the lower-pressured first hydraulic oil passage through orifice 102 and oil feeding passage 5c, thereby preventing hydraulic motor 46 from rotating at an extremely low speed for backward driving of the vehicle. Thus, the neutral range of the HST is expanded into its essential backward driving range so as to facilitate the adjustment of its neutral position.

Alternatively, spring 72 may be compressed so as to apply some spring force onto valve ball 71 when control arm 39" is located at its neutral position. That is, the relief pressure of relief valve 75 is higher than the closing pressure of bypass valve 100.

In this case, bypass valve 100 is used for expansion of dead zone in the vicinity of the neutral position of the HST, and independently, spring 72 is used for softening a shock caused by escape of the excessive residual hydraulic pressure in the HST circuit when the vehicle stops.

When control arm 39" is rotated for backward driving of the vehicle, the hydraulic pressure in the second hydraulic oil passage is increased so as to close bypass valve 100, thereby being maintained. Thus, a good driving-force transferring efficiency can be obtained at the whole of backward driving range except for an extremely low speed range therein.

Figure 14:
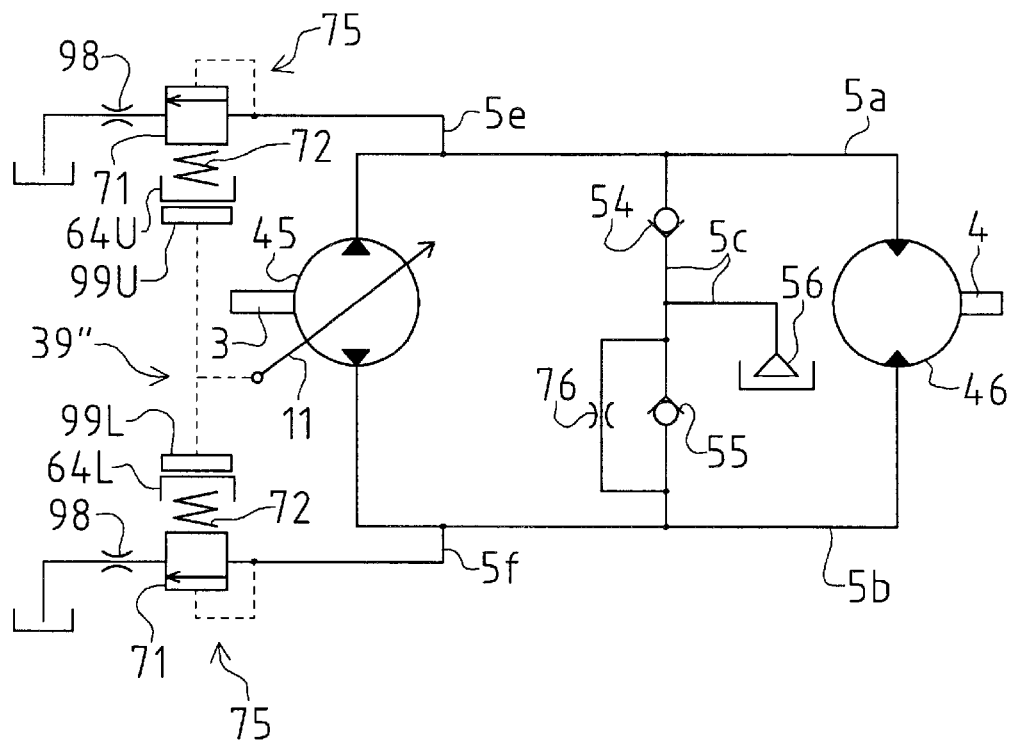
FIG. 14 is a hydraulic circuit diagram of a further modification of the HST of FIG. 13, wherein an orifice replaces a bypass valve.

The second modification may be further modified as shown in FIG. 14. That is, simple orifice 76 replacing bypass valve 100 may be interposed between the oil feeding hole 5c and lower oil passage hole 5b so as to function the adjustment of the neutral position of the HST. In this case, the hydraulic oil in the second hydraulic oil passage is always drained through orifice 76, thereby generating a little loss in driving-force transferring at the whole of the backward driving range of the HST as well as the extremely low speed backward driving range.

Also, in later-discussed third and fourth modifications of the pressure regulating device, bypass valve 100 may be replaced with orifice 76.

Figure 15:
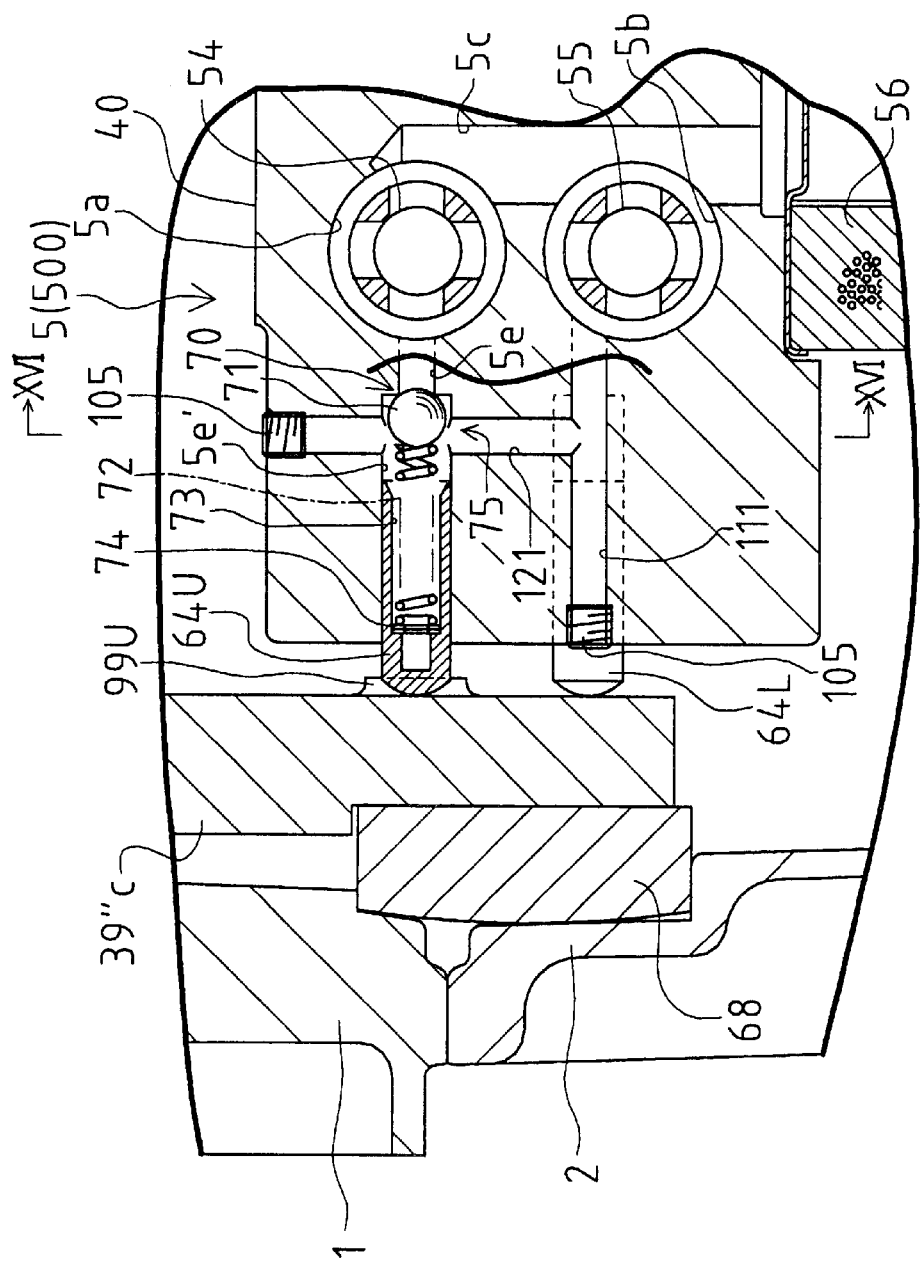
FIG. 15 is an enlarged sectional view of a pressure regulating device of an HST according to a third modification of the present invention.

A third modification of the pressure regulating device will be described in accordance with FIGS. 15 to 17. For the same purpose with the first modification, that is, for prevention of hydraulic oil in the whole of first and second hydraulic oil passages from being reduced, the second modification is improved as the third modification.

Figure 16:
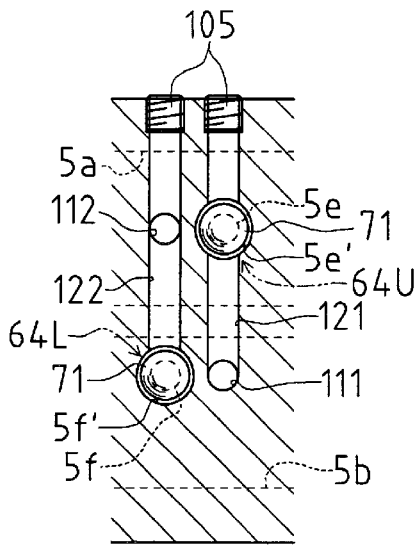
FIG. 16 is a cross-sectional view taken on line XVI—XVI of FIG. 15.
Figure 17:
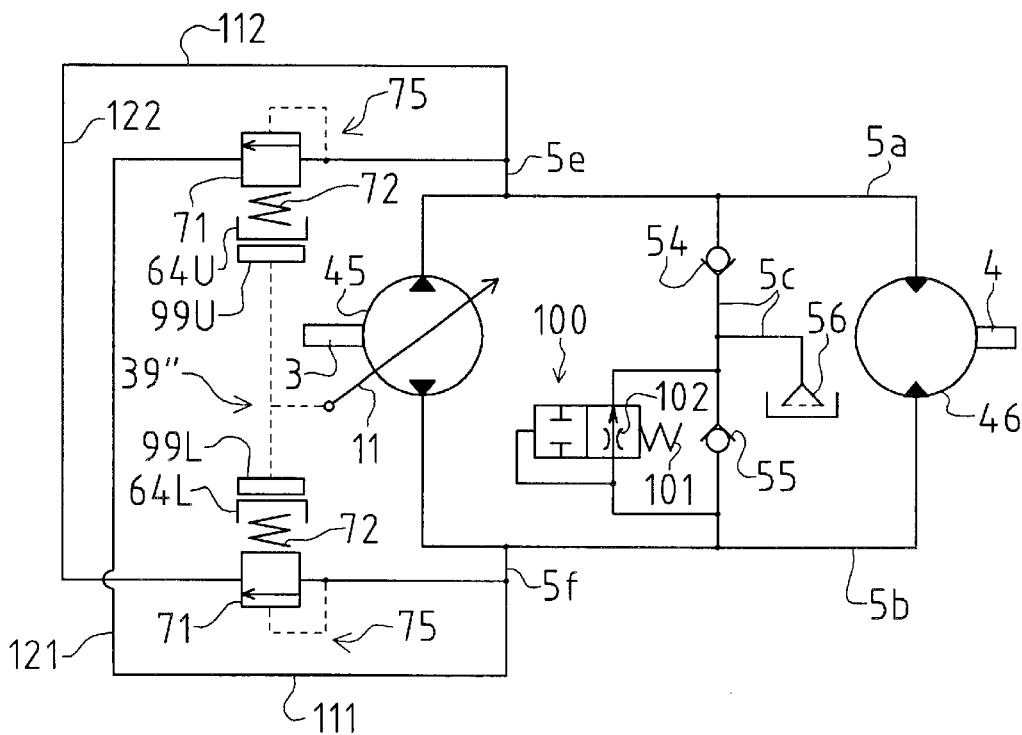
FIG. 17 is a hydraulic circuit diagram of the HST according to the third modification of the present invention.

In this third modification, as shown in FIG. 16, upper and lower oil holes 5e and 5f are not aligned in the vertical line but offset from each other in a horizontal direction in center section 5. As shown in FIGS. 15 and 16, center section 5 is bored with an outwardly open first return oil hole 111 just below upper oil hole 5e and just sideward from lower oil hole 5f. First return oil hole 111 is horizontally extended in parallel to oil holes 5e and 5f and connected to lower oil passage hole 5b of the second hydraulic oil passage. Center section 5 is also bored with an upwardly open vertical first connection oil hole 121 which intersects expanded portion 5e' of oil hole 5e and connected at its bottom end to first return oil hole 111. The outward openings of first return oil hole 111 and first connection oil hole 121 which are provided at respective outer surfaces of center section 5 are closed by respective caps 105.

As shown in FIG. 16, center section 5 is bored with an outwardly open second return oil hole 112 just above lower oil hole 5f and just sideward from upper oil hole 5e. Second return oil hole 112 is horizontally extended in parallel to oil holes 5e and 5f and connected to upper oil passage hole 5a of the first hydraulic oil passage. Center section 5 is also bored with an upwardly open vertical second connection oil hole 122 which intersects second return oil hole 112 and connected at its bottom end to expanded portion 5f′ of oil hole 5f. The outward openings of second return oil hole 112 and second connection oil hole 122 which are provided at respective outer surfaces of center section 5 are closed by respective caps 105.

Due to this structure, when the hydraulic pressure in the first hydraulic oil passage is higher-pressured so as to exceed the relief pressure of relief valve 75, the hydraulic oil introduced into oil hole 5e from the first hydraulic oil passage pushes upper valve ball 71 so as to open upper relief valve 75, thereby flowing into expanded portion 5e′ of oil hole 5e, and then, the hydraulic oil is introduced into lower oil passage hole 5b of the lower-pressured second hydraulic oil passage through first connection oil hole 121 and first return oil hole 111.

On the other hand, if the hydraulic pressure in the second hydraulic oil passage is higher-pressured so as to exceed the relief pressure of relief valve 75, the hydraulic oil introduced into oil hole 5f from the second hydraulic oil passage pushes lower valve ball 71 so as to open lower relief valve 75, thereby flowing into expanded portion 5f′ of oil hole 5f, and then, the hydraulic oil is introduced into upper oil passage hole 5a of the lower-pressured first hydraulic oil passage through second connection oil hole 122 and second return oil hole 112.

Thus, the hydraulic oil released through relief valve 75 from the higher-pressured first or second hydraulic oil passage is not drained to the oil sump but recovered into the lower-pressured second or first oil passage, thereby preventing the amount of hydraulic oil in the whole of HST circuit from being reduced.

A fourth modification of the pressure regulating device will be described in accordance with FIGS. 18 to 22. This serves as the improved second modification for improving the efficiency in driving the HST.

According to this modification, hydraulic pressure is released from relief valve 75 only when control arm 39″ is located at a certain range in the vicinity of the neutral range.

Figure 18:
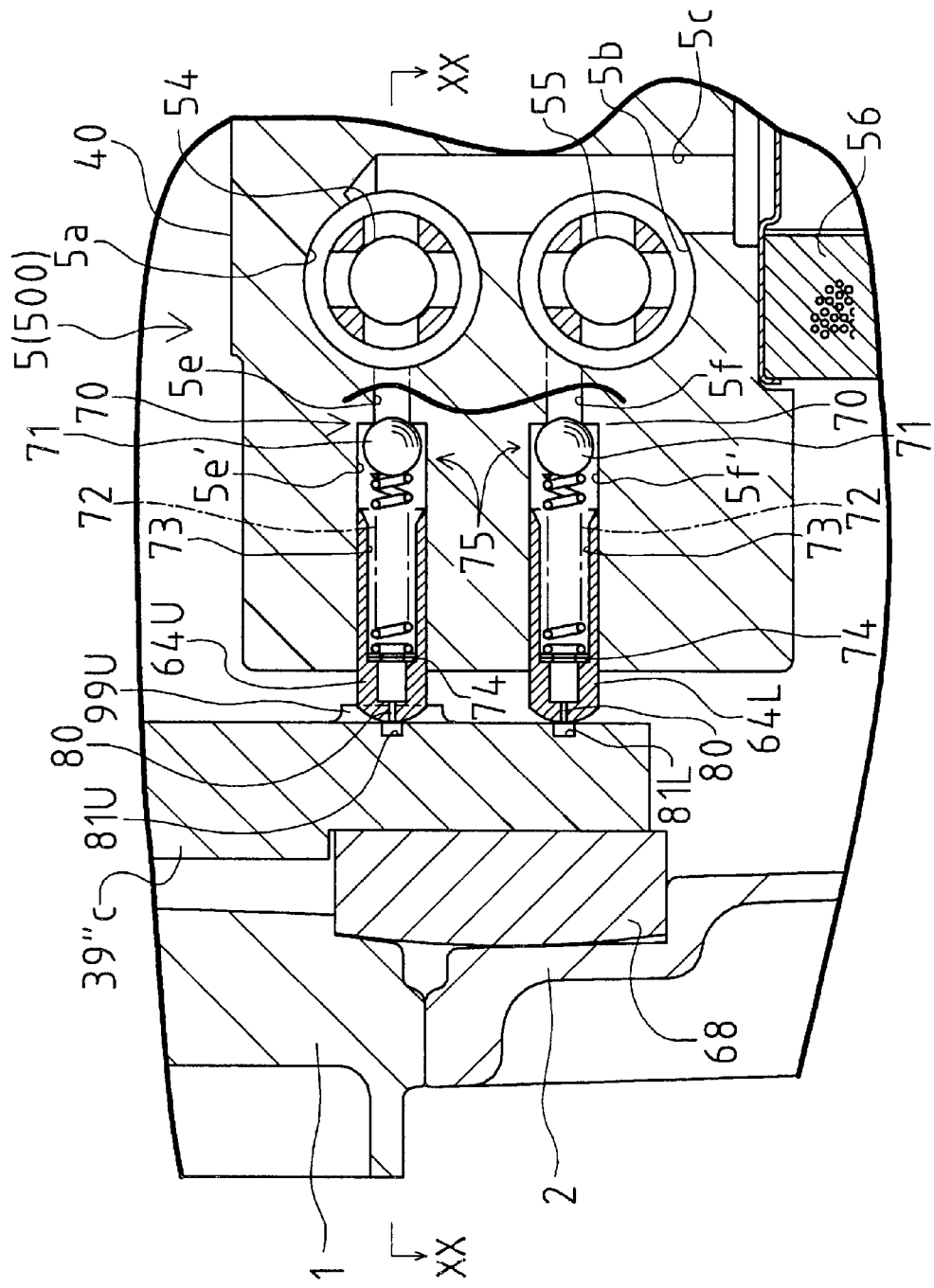
FIG. 18 is an enlarged sectional view of a pressure regulating device of an HST according to a fourth modification of the present invention.
Figure 19:
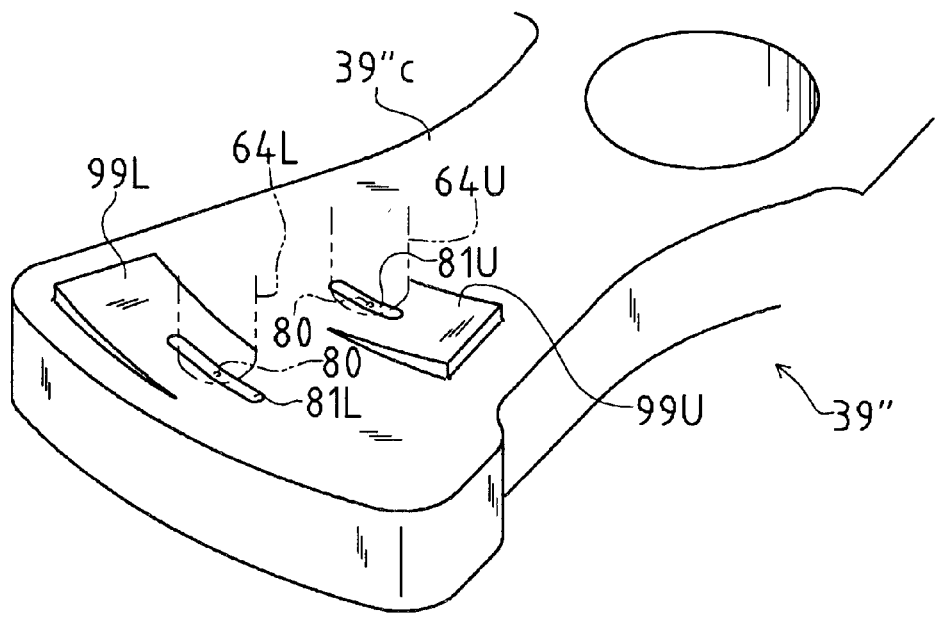
FIG. 19 is a perspective view of a contact plate according to the fourth modification of the present invention.
Figure 20:
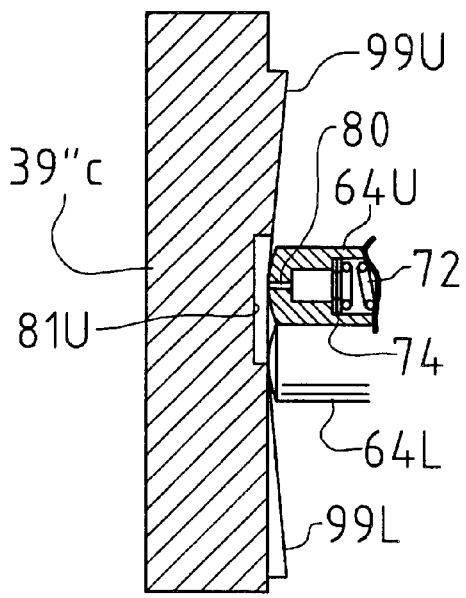
FIG. 20 is a cross-sectional view taken on line XX—XX of FIG. 18.
Figure 21:
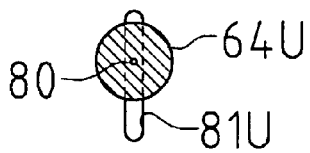
FIG. 21 is a fragmental view of the contact plate showing an escaping groove relative to an orifice.
Figure 22:
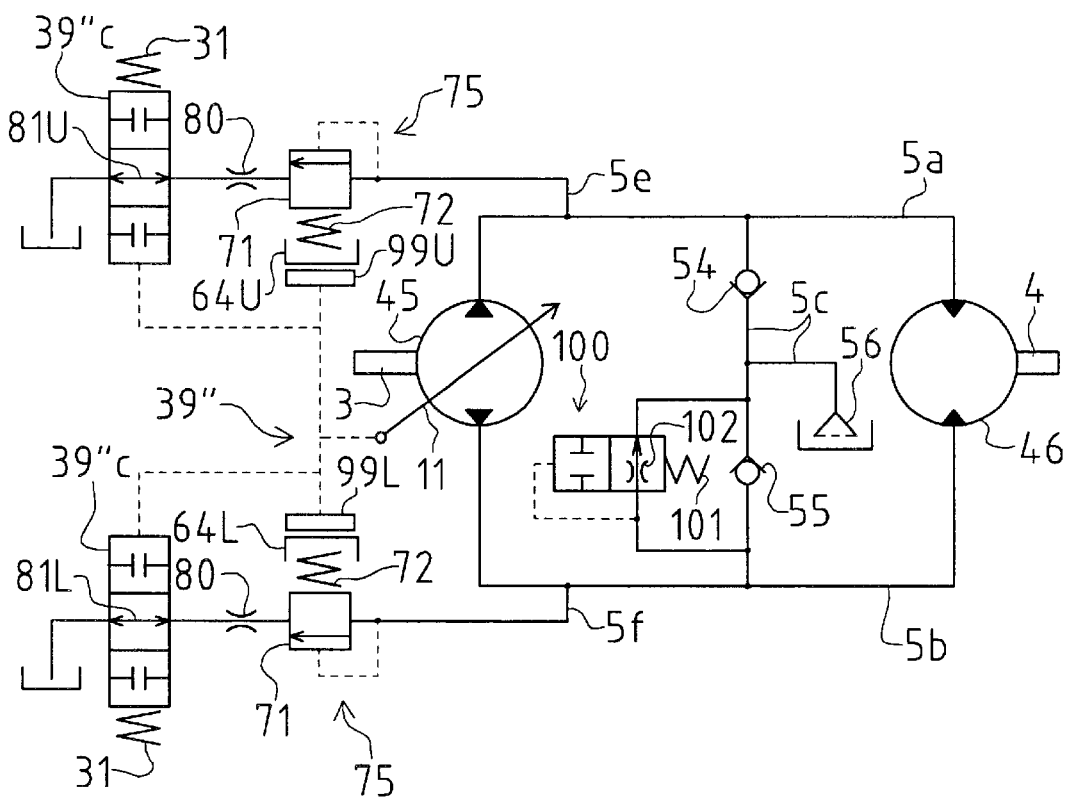
FIG. 22 is a hydraulic circuit diagram of the HST according to the fourth modification of the present invention.

As shown in FIG. 18, each of pistons 64U and 64L is formed in its tip portion with an outward open orifice 80 which replaces oil groove 98 provided to each of expanded portions 5e′ and 5f′ of oil holes 5e and 5f in the second modification. The hydraulic oil released from relief valve 75 is introduced into orifice 80. Contact plate 39″c of control arm 39″ is formed with narrow escaping grooves 81U and 81L in corresponding to orifices 80 of upper and lower pistons 64U and 64L abutting against contact plate 39″c. When control arm 39″ is positioned within the certain range in the vicinity of the neutral position, both orifices 80 are opened. Otherwise both orifices 80 are closed.

In each of pistons 64U and 64L, spring 72 is disposed in its natural length or slightly compressed so that its biasing force applied onto valve ball 71 against step 70 is none or little. As control arm 39″ is moved away from its neutral position, either piston 64U or 64L is pressed against slope surface 99U or 99L so as to compress spring 72, thereby increasing the spring force applied onto valve ball 71.

While the vehicle travels, sudden neutral-returning of control arm 39″ causes an excessively residual pressure in either the first or second hydraulic oil passage. When control arm 39″ reaches the vicinity of its neutral position, pistons 64U and 64L becomes free from slope surfaces 99U and 99L so that springs 72 do not or scarcely bias valve ball 71. Therefore, the hydraulic oil in the higher-pressured first or second hydraulic oil passage which generates the residual pressure opens relief valve 75 easily and is introduced into piston 64U or 64L. Also, in this state, orifices 80 of piston 64U and 64L communicate with respective escaping grooves 81U and 81L so as to drain the hydraulic oil which has generated the residual pressure therethrough, thereby absorbing the shock when the vehicle stops.

If an error exists in the neutral-positioning of movable swash plate 11, hydraulic pump 45 unexpectedly discharges a little amount of oil so as to make the hydraulic pressure of one of the first and second hydraulic oil passages slightly higher than the other. However, when control arm 39″ is still positioned in the vicinity of its neutral position, neither piston 64U nor 64L is pressed by slope surface 99U or 99L. Consequently, the spring force of spring 72 applied onto valve ball 71 is none or little. In this state, relief valve 75 is opened by even the slightly increased hydraulic pressure of one of the first and second hydraulic oil passages, thereby introducing the increased oil into corresponding piston 64U or 64L. Furthermore, this oil introduced into piston 64U or 64L is drained through orifice 80 and corresponding escaping groove 81U or 81L to the oil sump because orifices 80 of both pistons 64U and 64L communicate with respective escaping grooves 81U and 81L when control arm 39″ is in the vicinity of its neutral position. Thus, hydraulic motor 46 is prevented from being slightly driven, thereby securely keeping the vehicle in stationary.

When control arm 39″ is rotated for traveling of the vehicle, one of the first and second hydraulic oil passages is higher than the other according to the load applied onto axles 7. By the rotation of control arm 39″, sloped surface 99U or 99L of contact plate 39″c presses higher-pressured piston 64U or 64L into center section 5 so as to compress corresponding spring 72. The spring force generated by compressed spring 72 may be determined in relation to the hydraulic pressure increased in the first or second hydraulic oil passage so as to hold relief valve 75 closed or open. Whether relief valve 75 is closed or opened, orifice 80 of higher-pressured piston 64U or 64L is closed by contact plate 39′c so as to prevent the increased hydraulic pressure oil from being drained, thereby maintaining the good operational efficiency of the HST.

The advantage of the fourth modification in comparison with the second modification will be described.

In the second modification, the spring force of spring 72 must be determined as follows:

In order to expand the neutral zone of the HST or to prevent the dynamic brake, when control arm 39″ is located in its neutral position so as not to retract pistons 64U and 64L into center section 5, the spring force of spring 72 becomes approximately zero. On the other hand, in order to prevent the power loss in the HST, when control arm 39″ is rotated from the neutral position so as to make one of sloped surfaces 99U and 99L press corresponding piston 64U or 64L into center section 5, valve ball 71 is still closed by the spring force of spring 72 in spite of the regularly increased hydraulic pressure in the first or second hydraulic oil passage.

However, since the HST is desired to be minimized, the stroke of each of pistons 64U and 64L while being retracted into center section 5 must be small, thereby making it difficult to determine the spring force of spring 72 as above mentioned. Consequently, the precision in processing springs 72 and slope surfaces 99U and 99L and in assembling pistons 64U and 64L are required to be high.

On the contrary, in the fourth modification, when control arm 39″ is rotated from its neutral position, both orifices 80 are securely closed so as to prevent both first and second oil passage holes 5*a* and 5*b* from being subjected to oil escaping. Therefore, all the required matter for determining the spring force of spring 72 is that, in order to expand the neutral zone of the HST and suppressing the dynamic brake, it becomes approximately zero so as to let valve ball 71 ready to be opened easily when control arm 39″ is located in the vicinity of its neutral position. Consequently, such a high precision in processing springs 72 and sloped surfaces 99U and 99L is not required, thereby reducing the manufacturing costs.

Incidentally, in the fourth modification as well as in the second modification, the hydraulic pressure in the first or second hydraulic oil passage required to open relief valve 75 (the relief pressure) is increased according to the reduction of length of spring 72 while each of pistons 64U and 64L is retracted into center section 5. However, the variation of the relief pressure becomes important only when control arm 39″ is located so as to make orifices 80 communicate with escaping grooves 81U and 81L.

It is further understood by those skilled in the art that the foregoing description is a preferred embodiment of the disclosed apparatus and that various changes and modifications may be made in the invention without departing from the spirit and scope thereof.

What is claimed is:

1. A hydrostatic transmission, comprising:

a housing formed with a fluid sump;

a center section disposed within said fluid sump;

a hydraulic pump mounted on said center section;

a hydraulic motor mounted on said center section;

a fluid passage formed in said center section for hydraulically connecting said hydraulic pump with said hydraulic motor;

a bore opening at an outer surface of said center section in communication with said fluid passage;

an output operation device for controlling discharged fluid of said hydraulic pump, wherein said output operation device is moved to an operational position from a neutral position;

a piston reciprocally inserted into said bore so as to be allowed to project outward from said center section, said piston having an outer surface;

a valve disposed within said bore for opening and closing said bore to and from said fluid passage, said valve being biased to be closed by a spring disposed between said valve and said piston; and a member interlocking with said output operation device so as to contact with said outer surface of said piston, wherein, when said output operation device is adjacent to said neutral position and pressure fluid in said fluid passage forcedly opens said valve and flows into said bore, said member drains said pressure fluid in said bore to a low-pressured area.

2. The hydrostatic transmission as set forth in claim 1, wherein said low-pressured area is said fluid sump.

3. The hydrostatic transmission as set forth in claim 1, wherein said low-pressured area is said fluid passage for returning fluid from said hydraulic motor to said hydraulic pump.

4. A hydrostatic transmission, comprising:

a housing formed with a fluid sump;

a center section disposed within said fluid sump;

a hydraulic pump mounted on said center section;

a hydraulic motor mounted on said center section;

a fluid passage formed in said center section for hydraulically connecting said hydraulic pump with said hydraulic motor;

a bore opening at an outer surface of said center section in communication with said fluid passage;

an output operation device for controlling discharged fluid of said hydraulic pump, wherein said output operation device is moved to an operational position from a neutral position;

a piston reciprocally inserted into said bore so as to be allowed to project outward from said center section, said piston having an outer surface with an opening;

a valve disposed within said bore for opening and closing said bore to and from said fluid passage, said valve being biased to be closed by a spring disposed between said valve and said piston; and a member interlocking with said output operation device so as to contact with said outer surface of said piston, said member having a passage in communication with said fluid sump, wherein, when said output operation device is adjacent to said neutral position, said passage of said member is brought into communication with said opening of said piston so that, if pressure fluid in said fluid passage forcedly opens said valve and flows into said bore, said pressure fluid in said bore is introduced into said fluid sump through said opening of said piston and said passage of said member.

5. The hydrostatic transmission as set forth in claim 4, wherein said opening of said piston is restricted.

6. The hydrostatic transmission as set forth in claim 4, wherein said passage of said member is a groove formed on a contact surface of said member contacting with said outer surface of said piston.

7. A hydrostatic transmission, comprising:

a housing formed with a fluid sump;

a center section disposed within said fluid sump;

a hydraulic pump mounted on said center section;

a hydraulic motor mounted on said center section;

a pair of fluid passages formed in said center section for hydraulically connecting said hydraulic pump with said hydraulic motor;

a pair of bores opening at the same outer surface of said center section in communication with said respective fluid passages;

an output operation device for controlling discharged fluid of said hydraulic pump, wherein said output operation device is moved to operational positions from a neutral position;

a pair of pistons reciprocally inserted into said respective bores so as to be allowed to project outward from said center section, each of said pistons having an outer surface with an opening;

a pair of relief valves disposed within said respective bores so as to pass and shut a flow of fluid from said respective fluid passages to said respective bores, each of said relief valves being biased to shut said flow of fluid by a spring disposed between said relief valve and said piston, and each of said relief valves having a check valve for allowing an opposite flow of fluid from said bore to said fluid passage; and a member interlocking with said output operation device so as to contact with said outer surfaces of said pistons, said member having a passage, wherein, when said output operation device is adjacent to said neutral position, said openings of said pair of pistons are hydraulically connected with each other through said passage of said member so that, if fluid in a higher-pressured one of said fluid passages forcedly opens one of said relief valves and flows into one of said bores, said fluid in said one of said bores is introduced into the other of said fluid passages through said openings of said pistons, said passage of said member and said check valve of the other of said relief valves.

8. The hydrostatic transmission as set forth in claim 5, wherein said passage of said member is sectionally restricted.

9. A hydrostatic transmission, comprising:

a hydraulic pump and a hydraulic motor disposed within a fluid sump;

a hydraulic fluid passage constituting a closed hydraulic circuit for said hydraulic pump and said hydraulic motor;

a pressure regulating device communicating with said closed hydraulic circuit, wherein said pressure regulating device includes a relief valve biased against hydraulic pressure in said closed hydraulic circuit; and an output operation device for controlling discharged fluid of said hydraulic pump, said output operation device being operatively connected to said pressure regulating device, wherein, when said output operation device is located within a certain range including its neutral position, said pressure regulating device is brought into a first pressure setting condition, and wherein, when said output operation device is located out of said certain range, said pressure regulating device is brought into a second pressure setting condition.

10. The hydrostatic transmission as set forth in claim 9, wherein, when said pressure regulating device is put in said first pressure setting condition, the hydraulic pressure in said closed hydraulic circuit is so low as to keep a vehicle having said hydrostatic transmission in stationary while an engine of said vehicle drives, and wherein, when said pressure regulating device is put in said second pressure setting condition, the hydraulic pressure in said closed hydraulic circuit is so high as to allow said vehicle to travel.

11. The hydrostatic transmission as set forth in claim 9, said pressure regulating device comprising:

said relief valve for draining hydraulic fluid from said closed hydraulic circuit;

a spring biasing said relief valve;

a spring-retainer retaining said spring;

an opening formed in said spring-retainer;

a movable arm interlocking with said output operation device, said movable arm having a contact surface, wherein said spring biases said spring-retainer so as to make said spring-retainer abut against said contact surface; and an escaping groove formed on said contact surface of said movable arm so as to be open to said fluid sump, wherein said opening of said spring-retainer is opened to said escaping groove in said first pressure setting condition, and wherein said opening is closed from said escaping groove in said second pressure setting condition.

12. The hydrostatic transmission as set forth in claim 9, further comprising:

an orifice for limiting an amount of hydraulic fluid made to flow from said closed hydraulic circuit to an escaping groove by said pressure regulating device.

13. The hydrostatic transmission as set forth in claim 9, said pressure regulating device comprising:

said relief valve for draining hydraulic fluid from said closed hydraulic circuit;

a spring biasing said relief valve so as to close said relief valve against hydraulic pressure in said closed hydraulic circuit;

a spring-retainer retaining said spring;

a movable arm interlocking with said output operation device, said movable arm having a contact surface, wherein said spring biases said spring-retainer so as to make said spring-retainer abut against said contact surface, and a projection projecting from said contact surface of said movable arm so as to push said spring-retainer and compress said spring, wherein, in said first pressure setting condition, said spring-retainer is offset from said projection so as to extend said spring, thereby reducing a hydraulic pressure required to open said relief valve, and wherein, in said second pressure setting condition, said spring-retainer is pushed by said projection so as to compress said spring, thereby increasing the hydraulic pressure required to open said relief valve.

14. The hydrostatic transmission as set forth in claim 9, wherein said closed hydraulic circuit includes a first fluid passage for applying fluid from said hydraulic pump to said hydraulic motor and a second fluid passage for returning fluid from said hydraulic motor to said hydraulic pump.

15. The hydrostatic transmission as set forth in claim 14, said pressure regulating device further comprising:

a bypass passage allowing fluid to flow between said first fluid passage and said second fluid passage; and an orifice installed in said bypass passage.

16. The hydrostatic transmission as set forth in claim 14, said pressure regulating device further comprising:

a bypass passage allowing fluid to flow between said first fluid passage and said second fluid passage; and a bypass valve installed in said bypass passage, said bypass valve being opened when the hydraulic pressure upstream thereof is less than a predetermined value, and closed when the hydraulic pressure upstream thereof is not less than said predetermined value, wherein said predetermined value is less than the hydraulic pressure which is established when said pressure regulating device is put in said first pressure setting condition.

* * * * *